US012785899B2

(12) United States Patent
Shabara et al.

(10) Patent No.: US 12,785,899 B2
(45) Date of Patent: Nov. 3, 2026

(54) METHOD AND APPARATUS FOR INCREASING SYSTEM CAPACITY OF DEMODULATION REFERENCE SIGNALS

(71) Applicant: MEDIATEK INC., Hsinchu City (TW)

(72) Inventors: Yahia Ahmed Mahmoud Mahmoud Shabara, San Jose, CA (US); Parisa Cheraghi, San Jose, CA (US)

(73) Assignee: MEDIATEK INC., Hsinchu City (TW)

( * ) Notice: Subject to any disclaimer, the term of this patent is extended or adjusted under 35 U.S.C. 154(b) by 263 days.

(21) Appl. No.: 18/835,817

(22) PCT Filed: Apr. 12, 2023

(86) PCT No.: PCT/CN2023/087893
§ 371 (c)(1),
(2) Date: Aug. 5, 2024

(87) PCT Pub. No.: WO2023/198123
PCT Pub. Date: Oct. 19, 2023

(65) Prior Publication Data

US 2025/0141627 A1 May 1, 2025

Related U.S. Application Data

(60) Provisional application No. 63/330,822, filed on Apr. 14, 2022, provisional application No. 63/370,807, filed on Aug. 9, 2022.

(51) Int. Cl.
*H04L 5/00* (2006.01)

(52) U.S. Cl.
CPC .................................. *H04L 5/0051* (2013.01)

(58) Field of Classification Search
None
See application file for complete search history.

(56) References Cited

U.S. PATENT DOCUMENTS 11,018,823 B2 * 5/2021 Yoon .................. H04L 27/2613
2017/0338929 A1 11/2017 Lee et al.
(Continued)

FOREIGN PATENT DOCUMENTS

CN 110546912 A 12/2019
CN 110945816 A 3/2020
(Continued)

OTHER PUBLICATIONS

LG Electronics. "Physical layer design of UL signals and channels for NR-U" (published on May 17, 2019).
(Continued)

*Primary Examiner* — Nguyen H Ngo
(74) *Attorney, Agent, or Firm* — McClure, Qualey & Rodack, LLP

(57) ABSTRACT

This disclosure provides an apparatus and a method for wireless communication. Processing circuitry of the apparatus determines one or more antenna ports of the apparatus for data transmission. The processing circuitry generates, for each of the one or more antenna ports, a respective demodulation reference signal (DMRS) based on one of a first DMRS pattern, a second DMRS pattern, a third DMRS pattern, and a fourth DMRS pattern. The one or more antenna ports transmit the one or more DMRSs. The first DMRS pattern includes four code division multiplexing (CDM) groups each comprising a length-2 orthogonal cover code (OCC), the second DMRS pattern includes six CDM groups each comprising a length-2 OCC, the third DMRS pattern includes three CDM groups each comprising a length-4 OCC, and the fourth DMRS pattern includes two CDM groups each comprising a length-6 OCC.

20 Claims, 30 Drawing Sheets

(56) References Cited

U.S. PATENT DOCUMENTS

| | | | | |
|---|---|---|---|---|
| 2018/0026684 A1* | 1/2018 | Wei | H04B 7/0452 370/329 |
| 2020/0177416 A1* | 6/2020 | Jiang | H04L 5/0023 |
| 2022/0416961 A1* | 12/2022 | Frenne | H04L 5/0026 |
| 2025/0080387 A1* | 3/2025 | Zhang | H04L 5/0007 |

FOREIGN PATENT DOCUMENTS

| | | |
|---|---|---|
| CN | 111052662 A | 4/2020 |
| CN | 113169844 A | 7/2021 |
| WO | 2016127939 A1 | 8/2016 |
| WO | 2018174665 A1 | 9/2018 |

OTHER PUBLICATIONS

International Search Report and Written Opinion dated Jul. 18, 2023, issued in application No. PCT/CN2023/087893.
TW Office Action dated Nov. 20, 2023 in Taiwan application No. 112113871.
Extended European Search Report dated Mar. 16, 2026, issued in application No. EP 23787766.7.
Nokia, et al.; "Rel-18 UL and DL DMRS Enhancements;" 3GPP TSG RAN WG1 #110; Aug. 12, 2022; pp. 1-19.

* cited by examiner

Table 7.4.1.1.2-1: Parameters for PDSCH DM-RS configuration type 1.

| $p$ | CDM group $\lambda$ | $\Delta$ | $w_f(k')$ | | $w_t(l')$ | |
|---|---|---|---|---|---|---|
| | | | $k'=0$ | $k'=1$ | $l'=0$ | $l'=1$ |
| 1000 | 0 | 0 | +1 | +1 | +1 | +1 |
| 1001 | 0 | 0 | +1 | -1 | +1 | +1 |
| 1002 | 1 | 1 | +1 | +1 | +1 | +1 |
| 1003 | 1 | 1 | +1 | -1 | +1 | +1 |
| 1004 | 0 | 0 | +1 | +1 | +1 | -1 |
| 1005 | 0 | 0 | +1 | -1 | +1 | -1 |
| 1006 | 1 | 1 | +1 | +1 | +1 | -1 |
| 1007 | 1 | 1 | +1 | -1 | +1 | -1 |

*FIG. 2A*

Table 7.4.1.1.2-2: Parameters for PDSCH DM-RS configuration type 2.

| $p$ | CDM group $\lambda$ | $\Delta$ | $w_f(k')$ | | $w_t(l')$ | |
|---|---|---|---|---|---|---|
| | | | $k'=0$ | $k'=1$ | $l'=0$ | $l'=1$ |
| 1000 | 0 | 0 | +1 | +1 | +1 | +1 |
| 1001 | 0 | 0 | +1 | -1 | +1 | +1 |
| 1002 | 1 | 2 | +1 | +1 | +1 | +1 |
| 1003 | 1 | 2 | +1 | -1 | +1 | +1 |
| 1004 | 2 | 4 | +1 | +1 | +1 | +1 |
| 1005 | 2 | 4 | +1 | -1 | +1 | +1 |
| 1006 | 0 | 0 | +1 | +1 | +1 | -1 |
| 1007 | 0 | 0 | +1 | -1 | +1 | -1 |
| 1008 | 1 | 2 | +1 | +1 | +1 | -1 |
| 1009 | 1 | 2 | +1 | -1 | +1 | -1 |
| 1010 | 2 | 4 | +1 | +1 | +1 | -1 |
| 1011 | 2 | 4 | +1 | -1 | +1 | -1 |

*FIG. 2B*

Table 7.4.1.1.2-5: PDSCH DM-RS time index $l'$ and antenna ports $p$.

| Single or double symbol DM-RS | $l'$ | Supported antenna ports $p$ | |
|---|---|---|---|
| | | Configuration type 1 | Configuration type 2 |
| single | 0 | 1000 – 1003 | 1000 – 1005 |
| double | 0, 1 | 1000 – 1007 | 1000 – 1011 |

*FIG. 2C*

Type 1: Single-Symbol

| Port | 1000 | | 1001 | | 1002 | | 1003 | |
|---|---|---|---|---|---|---|---|---|
| sc idx/sym idx | 0 | 1 | 0 | 1 | 0 | 1 | 0 | 1 |
| 11 | | | | | 1 | | -1 | |
| 10 | 1 | | -1 | | | | | |
| 9 | | | | | 1 | | 1 | |
| 8 | 1 | | 1 | | | | | |
| 7 | | | | | 1 | | -1 | |
| 6 | 1 | | -1 | | | | | |
| 5 | | | | | 1 | | 1 | |
| 4 | 1 | | 1 | | | | | |
| 3 | | | | | 1 | | -1 | |
| 2 | 1 | | -1 | | | | | |
| 1 | | | | | 1 | | 1 | |
| 0 | 1 | | 1 | | | | | |

203

202

201

Type 1: Double-Symbol

| Port | 1000 | | 1001 | | 1002 | | 1003 | |
|---|---|---|---|---|---|---|---|---|
| sc idx/sym idx | 0 | 1 | 0 | 1 | 0 | 1 | 0 | 1 |
| 11 | | | | | 1 | 1 | -1 | -1 |
| 10 | 1 | 1 | -1 | -1 | | | | |
| 9 | | | | | 1 | 1 | 1 | 1 |
| 8 | 1 | 1 | 1 | 1 | | | | |
| 7 | | | | | 1 | 1 | -1 | -1 |
| 6 | 1 | 1 | -1 | -1 | | | | |
| 5 | | | | | 1 | 1 | 1 | 1 |
| 4 | 1 | 1 | 1 | 1 | | | | |
| 3 | | | | | 1 | 1 | -1 | -1 |
| 2 | 1 | 1 | -1 | -1 | | | | |
| 1 | | | | | 1 | 1 | 1 | 1 |
| 0 | 1 | 1 | 1 | 1 | | | | |

| Port | 1004 | | 1005 | | 1006 | | 1007 | |
|---|---|---|---|---|---|---|---|---|
| sc idx/sym idx | 0 | 1 | 0 | 1 | 0 | 1 | 0 | 1 |
| 11 | | | | | 1 | -1 | -1 | 1 |
| 10 | 1 | -1 | -1 | 1 | | | | |
| 9 | | | | | 1 | -1 | 1 | -1 |
| 8 | 1 | -1 | 1 | -1 | | | | |
| 7 | | | | | 1 | -1 | -1 | 1 |
| 6 | 1 | -1 | -1 | 1 | | | | |
| 5 | | | | | 1 | -1 | 1 | -1 |
| 4 | 1 | -1 | 1 | -1 | | | | |
| 3 | | | | | 1 | -1 | -1 | 1 |
| 2 | 1 | -1 | -1 | 1 | | | | |
| 1 | | | | | 1 | -1 | 1 | -1 |
| 0 | 1 | -1 | 1 | -1 | | | | |

FIG. 2D

Type 2: Single-Symbol

| Port | 1000 | | 1001 | | 1002 | | 1003 | | 1004 | | 1005 | |
|---|---|---|---|---|---|---|---|---|---|---|---|---|
| sc idx/sym idx | 0 | 1 | 0 | 1 | 0 | 1 | 0 | 1 | 0 | 1 | 0 | 1 |
| 11 | | | | | | | | | 1 | | -1 | |
| 10 | | | | | | | | | 1 | | 1 | |
| 9 | | | | | 1 | | -1 | | | | | |
| 8 | | | | | 1 | | 1 | | | | | |
| 7 | 1 | | -1 | | | | | | | | | |
| 6 | 1 | | 1 | | | | | | | | | |
| 5 | | | | | | | | | 1 | | -1 | |
| 4 | | | | | | | | | 1 | | 1 | |
| 3 | | | | | 1 | | -1 | | | | | |
| 2 | | | | | 1 | | 1 | | | | | |
| 1 | 1 | | -1 | | | | | | | | | |
| 0 | 1 | | 1 | | | | | | | | | |

212

211

Type 2: Double-Symbol

| Port | 1000 | | 1001 | | 1002 | | 1003 | | 1004 | | 1005 | |
|---|---|---|---|---|---|---|---|---|---|---|---|---|
| sc idx/sym idx | 0 | 1 | 0 | 1 | 0 | 1 | 0 | 1 | 0 | 1 | 0 | 1 |
| 11 | | | | | | | | | 1 | 1 | -1 | -1 |
| 10 | | | | | | | | | 1 | 1 | 1 | 1 |
| 9 | | | | | 1 | 1 | -1 | -1 | | | | |
| 8 | | | | | 1 | 1 | 1 | 1 | | | | |
| 7 | 1 | 1 | -1 | -1 | | | | | | | | |
| 6 | 1 | 1 | 1 | 1 | | | | | | | | |
| 5 | | | | | | | | | 1 | 1 | -1 | -1 |
| 4 | | | | | | | | | 1 | 1 | 1 | 1 |
| 3 | | | | | 1 | 1 | -1 | -1 | | | | |
| 2 | | | | | 1 | 1 | 1 | 1 | | | | |
| 1 | 1 | 1 | -1 | -1 | | | | | | | | |
| 0 | 1 | 1 | 1 | 1 | | | | | | | | |

| Port | 1006 | | 1007 | | 1008 | | 1009 | | 1010 | | 1011 | |
|---|---|---|---|---|---|---|---|---|---|---|---|---|
| sc idx/sym idx | 0 | 1 | 0 | 1 | 0 | 1 | 0 | 1 | 0 | 1 | 0 | 1 |
| 11 | | | | | | | | | 1 | -1 | -1 | 1 |
| 10 | | | | | | | | | 1 | -1 | 1 | -1 |
| 9 | | | | | 1 | -1 | -1 | 1 | | | | |
| 8 | | | | | 1 | -1 | 1 | -1 | | | | |
| 7 | 1 | -1 | -1 | 1 | | | | | | | | |
| 6 | 1 | -1 | 1 | -1 | | | | | | | | |
| 5 | | | | | | | | | 1 | -1 | -1 | 1 |
| 4 | | | | | | | | | 1 | -1 | 1 | -1 |
| 3 | | | | | 1 | -1 | -1 | 1 | | | | |
| 2 | | | | | 1 | -1 | 1 | -1 | | | | |
| 1 | 1 | -1 | -1 | 1 | | | | | | | | |
| 0 | 1 | -1 | 1 | -1 | | | | | | | | |

FIG. 2E

Type 1 Extension

| Port (p) | CDM group (λ) | Δ | $Wf(k')$ | | $Wt(l')$ | |
|---|---|---|---|---|---|---|
| | | | k'=0 | k'=1 | l'=0 | l'=1 |
| 1000 | 0 | 0 | 1 | 1 | 1 | 1 |
| 1001 | 0 | 0 | 1 | -1 | 1 | 1 |
| 1002 | 1 | 1 | 1 | 1 | 1 | 1 |
| 1003 | 1 | 1 | 1 | -1 | 1 | 1 |
| 1004 | 2 | 4 | 1 | 1 | 1 | 1 |
| 1005 | 2 | 4 | 1 | -1 | 1 | 1 |
| 1006 | 3 | 5 | 1 | 1 | 1 | 1 |
| 1007 | 3 | 5 | 1 | -1 | 1 | 1 |
| 1008 | 0 | 0 | 1 | 1 | 1 | -1 |
| 1009 | 0 | 0 | 1 | -1 | 1 | -1 |
| 1010 | 1 | 1 | 1 | 1 | 1 | -1 |
| 1011 | 1 | 1 | 1 | -1 | 1 | -1 |
| 1012 | 2 | 4 | 1 | 1 | 1 | -1 |
| 1013 | 2 | 4 | 1 | -1 | 1 | -1 |
| 1014 | 3 | 5 | 1 | 1 | 1 | -1 |
| 1015 | 3 | 5 | 1 | -1 | 1 | -1 |

*FIG. 3A*

Type 1 Extension: Double-Symbol

| Port | 1000 | | 1001 | | 1002 | | 1003 | | 1004 | | 1005 | | 1006 | | 1007 | |
|---|---|---|---|---|---|---|---|---|---|---|---|---|---|---|---|---|
| sc idx/sym idx | 0 | 1 | 0 | 1 | 0 | 1 | 0 | 1 | 0 | 1 | 0 | 1 | 0 | 1 | 0 | 1 |
| 23 | | | | | | | | | | | | | 1 | 1 | -1 | -1 |
| 22 | | | | | | | | | 1 | 1 | -1 | -1 | | | | |
| 21 | | | | | | | | | | | | | 1 | 1 | 1 | 1 |
| 20 | | | | | | | | | 1 | 1 | 1 | 1 | | | | |
| 19 | | | | | 1 | 1 | -1 | -1 | | | | | | | | |
| 18 | 1 | 1 | -1 | -1 | | | | | | | | | | | | |
| 17 | | | | | 1 | 1 | 1 | 1 | | | | | | | | |
| 16 | 1 | 1 | 1 | 1 | | | | | | | | | | | | |
| 15 | | | | | | | | | | | | | 1 | 1 | -1 | -1 |
| 14 | | | | | | | | | 1 | 1 | -1 | -1 | | | | |
| 13 | | | | | | | | | | | | | 1 | 1 | 1 | 1 |
| 12 | | | | | | | | | 1 | 1 | 1 | 1 | | | | |
| 11 | | | | | 1 | 1 | -1 | -1 | | | | | | | | |
| 10 | 1 | 1 | -1 | -1 | | | | | | | | | | | | |
| 9 | | | | | 1 | 1 | 1 | 1 | | | | | | | | |
| 8 | 1 | 1 | 1 | 1 | | | | | | | | | | | | |
| 7 | | | | | | | | | | | | | 1 | 1 | -1 | -1 |
| 6 | | | | | | | | | 1 | 1 | -1 | -1 | | | | |
| 5 | | | | | | | | | | | | | 1 | 1 | 1 | 1 |
| 4 | | | | | | | | | 1 | 1 | 1 | 1 | | | | |
| 3 | | | | | 1 | 1 | -1 | -1 | | | | | | | | |
| 2 | 1 | 1 | -1 | -1 | | | | | | | | | | | | |
| 1 | | | | | 1 | 1 | 1 | 1 | | | | | | | | |
| 0 | 1 | 1 | 1 | 1 | | | | | | | | | | | | |

| Port | 1008 | | 1009 | | 1010 | | 1011 | | 1012 | | 1013 | | 1014 | | 1015 | |
|---|---|---|---|---|---|---|---|---|---|---|---|---|---|---|---|---|
| sc idx/sym idx | 0 | 1 | 0 | 1 | 0 | 1 | 0 | 1 | 0 | 1 | 0 | 1 | 0 | 1 | 0 | 1 |
| 23 | | | | | | | | | | | | | 1 | -1 | -1 | 1 |
| 22 | | | | | | | | | 1 | 1 | -1 | 1 | | | 1 | -1 |
| 21 | | | | | | | | | | | | | 1 | -1 | | |
| 20 | | | | | | | | | 1 | 1 | 1 | -1 | | | | |
| 19 | | | | | 1 | -1 | -1 | 1 | | | | | | | | |
| 18 | 1 | -1 | -1 | 1 | | | | | | | | | | | | |
| 17 | | | | | 1 | -1 | 1 | -1 | | | | | | | | |
| 16 | 1 | -1 | 1 | -1 | | | | | | | | | | | | |
| 15 | | | | | | | | | | | | | 1 | -1 | -1 | 1 |
| 14 | | | | | | | | | 1 | -1 | -1 | 1 | | | | |
| 13 | | | | | | | | | | | | | 1 | -1 | 1 | -1 |
| 12 | | | | | | | | | 1 | -1 | 1 | -1 | | | | |
| 11 | | | | | 1 | -1 | -1 | 1 | | | | | | | | |
| 10 | 1 | -1 | -1 | 1 | | | | | | | | | | | | |
| 9 | | | | | 1 | -1 | 1 | -1 | | | | | | | | |
| 8 | 1 | -1 | 1 | -1 | | | | | | | | | | | | |
| 7 | | | | | | | | | | | | | 1 | -1 | -1 | 1 |
| 6 | | | | | | | | | 1 | -1 | -1 | 1 | | | | |
| 5 | | | | | | | | | | | | | 1 | -1 | 1 | -1 |
| 4 | | | | | | | | | 1 | -1 | 1 | -1 | | | | |
| 3 | | | | | 1 | -1 | -1 | 1 | | | | | | | | |
| 2 | 1 | -1 | -1 | 1 | | | | | | | | | | | | |
| 1 | | | | | 1 | -1 | 1 | -1 | | | | | | | | |
| 0 | 1 | -1 | 1 | -1 | | | | | | | | | | | | |

*FIG. 3C*

Type 2 Extension

| Port (p) | CDM group (λ) | Δ | $W_f(k')$ | | $W_t(l')$ | |
|---|---|---|---|---|---|---|
| | | | k'=0 | k'=1 | l'=0 | l'=1 |
| 1000 | 0 | 0 | 1 | 1 | 1 | 1 |
| 1001 | 0 | 0 | 1 | -1 | 1 | 1 |
| 1002 | 1 | 2 | 1 | 1 | 1 | 1 |
| 1003 | 1 | 2 | 1 | -1 | 1 | 1 |
| 1004 | 2 | 4 | 1 | 1 | 1 | 1 |
| 1005 | 2 | 4 | 1 | -1 | 1 | 1 |
| 1006 | 3 | 6 | 1 | 1 | 1 | 1 |
| 1007 | 3 | 6 | 1 | -1 | 1 | 1 |
| 1008 | 4 | 8 | 1 | 1 | 1 | 1 |
| 1009 | 4 | 8 | 1 | -1 | 1 | 1 |
| 1010 | 5 | 10 | 1 | 1 | 1 | 1 |
| 1011 | 5 | 10 | 1 | -1 | 1 | 1 |
| 1012 | 0 | 0 | 1 | 1 | 1 | -1 |
| 1013 | 0 | 0 | 1 | -1 | 1 | -1 |
| 1014 | 1 | 2 | 1 | 1 | 1 | -1 |
| 1015 | 1 | 2 | 1 | -1 | 1 | -1 |
| 1016 | 2 | 4 | 1 | 1 | 1 | -1 |
| 1017 | 2 | 4 | 1 | -1 | 1 | -1 |
| 1018 | 3 | 6 | 1 | 1 | 1 | -1 |
| 1019 | 3 | 6 | 1 | -1 | 1 | -1 |
| 1020 | 4 | 8 | 1 | 1 | 1 | -1 |
| 1021 | 4 | 8 | 1 | -1 | 1 | -1 |
| 1022 | 5 | 10 | 1 | 1 | 1 | -1 |
| 1023 | 5 | 10 | 1 | -1 | 1 | -1 |

*FIG. 4A*

Type 2 Extension: Single-Symbol

| Port | 1000 | | 1001 | | 1002 | | 1003 | | 1004 | | 1005 | |
|---|---|---|---|---|---|---|---|---|---|---|---|---|
| sc idx/sym idx | 0 | 1 | 0 | 1 | 0 | 1 | 0 | 1 | 0 | 1 | 0 | 1 |
| 11 | | | | | | | | | | | | |
| 10 | | | | | | | | | | | | |
| 9 | | | | | | | | | | | | |
| 8 | | | | | | | | | | | | |
| 7 | | | | | | | | | | | | |
| 6 | | | | | | | | | | | | |
| 5 | | | | | | | | | 1 | | -1 | |
| 4 | | | | | | | | | 1 | | 1 | |
| 3 | | | | | 1 | | -1 | | | | | |
| 2 | | | | | 1 | | 1 | | | | | |
| 1 | 1 | | -1 | | | | | | | | | |
| 0 | 1 | | 1 | | | | | | | | | |

| Port | 1006 | | 1007 | | 1008 | | 1009 | | 1010 | | 1011 | |
|---|---|---|---|---|---|---|---|---|---|---|---|---|
| sc idx/sym idx | 0 | 1 | 0 | 1 | 0 | 1 | 0 | 1 | 0 | 1 | 0 | 1 |
| 11 | | | | | | | | | 1 | | -1 | |
| 10 | | | | | | | | | 1 | | 1 | |
| 9 | | | | | 1 | | -1 | | | | | |
| 8 | | | | | 1 | | 1 | | | | | |
| 7 | 1 | | -1 | | | | | | | | | |
| 6 | 1 | | 1 | | | | | | | | | |
| 5 | | | | | | | | | | | | |
| 4 | | | | | | | | | | | | |
| 3 | | | | | | | | | | | | |
| 2 | | | | | | | | | | | | |
| 1 | | | | | | | | | | | | |
| 0 | | | | | | | | | | | | |

FIG. 4B

Type 2 Extension: Double-Symbol

| Port | 1000 | | 1001 | | 1002 | | 1003 | | 1004 | | 1005 | | 1006 | | 1007 | | 1008 | | 1009 | | 1010 | | 1011 | |
|---|---|---|---|---|---|---|---|---|---|---|---|---|---|---|---|---|---|---|---|---|---|---|---|---|
| sc idx/sym idx | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 11 | | | | | | | | | | | | | | | | | | | | | 1 | 1 | -1 | -1 |
| 10 | | | | | | | | | | | | | | | | | | | | | 1 | 1 | 1 | 1 |
| 9 | | | | | | | | | | | | | | | | | 1 | 1 | -1 | -1 | | | | |
| 8 | | | | | | | | | | | | | | | | | 1 | 1 | 1 | 1 | | | | |
| 7 | | | | | | | | | | | | | 1 | 1 | -1 | -1 | | | | | | | | |
| 6 | | | | | | | | | | | | | 1 | 1 | 1 | 1 | | | | | | | | |
| 5 | | | | | | | | | 1 | 1 | -1 | -1 | | | | | | | | | | | | |
| 4 | | | | | | | | | 1 | 1 | 1 | 1 | | | | | | | | | | | | |
| 3 | | | | | 1 | 1 | -1 | -1 | | | | | | | | | | | | | | | | |
| 2 | | | | | 1 | 1 | 1 | 1 | | | | | | | | | | | | | | | | |
| 1 | 1 | 1 | -1 | -1 | | | | | | | | | | | | | | | | | | | | |
| 0 | 1 | 1 | 1 | 1 | | | | | | | | | | | | | | | | | | | | |

| Port | 1012 | | 1013 | | 1014 | | 1015 | | 1016 | | 1017 | | 1018 | | 1019 | | 1020 | | 1021 | | 1022 | | 1023 | |
|---|---|---|---|---|---|---|---|---|---|---|---|---|---|---|---|---|---|---|---|---|---|---|---|---|
| sc idx/sym idx | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 11 | | | | | | | | | | | | | | | | | | | | | 1 | -1 | -1 | 1 |
| 10 | | | | | | | | | | | | | | | | | | | | | 1 | -1 | 1 | -1 |
| 9 | | | | | | | | | | | | | | | | | 1 | -1 | -1 | 1 | | | | |
| 8 | | | | | | | | | | | | | | | | | 1 | -1 | 1 | -1 | | | | |
| 7 | | | | | | | | | | | | | 1 | -1 | -1 | 1 | | | | | | | | |
| 6 | | | | | | | | | | | | | 1 | -1 | 1 | -1 | | | | | | | | |
| 5 | | | | | | | | | 1 | -1 | -1 | 1 | | | | | | | | | | | | |
| 4 | | | | | | | | | 1 | -1 | 1 | -1 | | | | | | | | | | | | |
| 3 | | | | | 1 | -1 | -1 | 1 | | | | | | | | | | | | | | | | |
| 2 | | | | | 1 | -1 | 1 | -1 | | | | | | | | | | | | | | | | |
| 1 | 1 | -1 | -1 | 1 | | | | | | | | | | | | | | | | | | | | |
| 0 | 1 | -1 | 1 | -1 | | | | | | | | | | | | | | | | | | | | |

FIG. 4C

Frequency-based Increased OCC Design Pattern #1

| Port (p) | CDM group (λ) | Δ | $Wf(k')$ | | | | $Wt(l')$ | |
|---|---|---|---|---|---|---|---|---|
| | | | k'=0 | k'=1 | k'=2 | k'=3 | l'=0 | l'=1 |
| 1000 | 0 | 0 | 1 | 1 | 1 | 1 | 1 | 1 |
| 1001 | 0 | 0 | 1 | -1 | 1 | -1 | 1 | 1 |
| 1002 | 0 | 0 | 1 | 1 | -1 | -1 | 1 | 1 |
| 1003 | 0 | 0 | 1 | -1 | -1 | 1 | 1 | 1 |
| 1004 | 1 | 4 | 1 | 1 | 1 | 1 | 1 | 1 |
| 1005 | 1 | 4 | 1 | -1 | 1 | -1 | 1 | 1 |
| 1006 | 1 | 4 | 1 | 1 | -1 | -1 | 1 | 1 |
| 1007 | 1 | 4 | 1 | -1 | -1 | 1 | 1 | 1 |
| 1008 | 2 | 8 | 1 | 1 | 1 | 1 | 1 | 1 |
| 1009 | 2 | 8 | 1 | -1 | 1 | -1 | 1 | 1 |
| 1010 | 2 | 8 | 1 | 1 | -1 | -1 | 1 | 1 |
| 1011 | 2 | 8 | 1 | -1 | -1 | 1 | 1 | 1 |
| 1012 | 0 | 0 | 1 | 1 | 1 | 1 | 1 | -1 |
| 1013 | 0 | 0 | 1 | -1 | 1 | -1 | 1 | -1 |
| 1014 | 0 | 0 | 1 | 1 | -1 | -1 | 1 | -1 |
| 1015 | 0 | 0 | 1 | -1 | -1 | 1 | 1 | -1 |
| 1016 | 1 | 4 | 1 | 1 | 1 | 1 | 1 | -1 |
| 1017 | 1 | 4 | 1 | -1 | 1 | -1 | 1 | -1 |
| 1018 | 1 | 4 | 1 | 1 | -1 | -1 | 1 | -1 |
| 1019 | 1 | 4 | 1 | -1 | -1 | 1 | 1 | -1 |
| 1020 | 2 | 8 | 1 | 1 | 1 | 1 | 1 | -1 |
| 1021 | 2 | 8 | 1 | -1 | 1 | -1 | 1 | -1 |
| 1022 | 2 | 8 | 1 | 1 | -1 | -1 | 1 | -1 |
| 1023 | 2 | 8 | 1 | -1 | -1 | 1 | 1 | -1 |

*FIG. 6A*

Frequency-based Increased OCC Design Pattern #1: Single-Symbol

| Port | 1000 | | 1001 | | 1002 | | 1003 | | 1004 | | 1005 | | 1006 | | 1007 | | 1008 | | 1009 | | 1010 | | 1011 | |
|---|---|---|---|---|---|---|---|---|---|---|---|---|---|---|---|---|---|---|---|---|---|---|---|---|
| sc idx/sym idx | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 11 | | | | | | | | | | | | | | | | | 1 | | -1 | | -1 | | 1 | |
| 10 | | | | | | | | | | | | | | | | | 1 | | 1 | | -1 | | -1 | |
| 9 | | | | | | | | | | | | | | | | | 1 | | -1 | | 1 | | -1 | |
| 8 | | | | | | | | | | | | | | | | | 1 | | 1 | | 1 | | 1 | |
| 7 | | | | | | | | | 1 | | -1 | | -1 | | 1 | | | | | | | | | |
| 6 | | | | | | | | | 1 | | 1 | | -1 | | -1 | | | | | | | | | |
| 5 | | | | | | | | | 1 | | -1 | | 1 | | -1 | | | | | | | | | |
| 4 | | | | | | | | | 1 | | 1 | | 1 | | 1 | | | | | | | | | |
| 3 | 1 | | -1 | | -1 | | 1 | | | | | | | | | | | | | | | | | |
| 2 | 1 | | 1 | | -1 | | -1 | | | | | | | | | | | | | | | | | |
| 1 | 1 | | -1 | | 1 | | -1 | | | | | | | | | | | | | | | | | |
| 0 | 1 | | 1 | | 1 | | 1 | | | | | | | | | | | | | | | | | |

FIG. 6B

Frequency-based Increased OCC Design Pattern #1: Double-Symbol

| Port | 1000 | | 1001 | | 1002 | | 1003 | | 1004 | | 1005 | | 1006 | | 1007 | | 1008 | | 1009 | | 1010 | | 1011 | |
|---|---|---|---|---|---|---|---|---|---|---|---|---|---|---|---|---|---|---|---|---|---|---|---|---|
| sc idx/sym idx | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 11 | | | | | | | | | | | | | | | | | 1 | 1 | -1 | -1 | -1 | -1 | 1 | 1 |
| 10 | | | | | | | | | | | | | | | | | 1 | 1 | 1 | 1 | -1 | -1 | -1 | -1 |
| 9 | | | | | | | | | | | | | | | | | 1 | 1 | -1 | -1 | 1 | 1 | -1 | -1 |
| 8 | | | | | | | | | | | | | | | | | 1 | 1 | 1 | 1 | 1 | 1 | 1 | 1 |
| 7 | | | | | | | | | 1 | 1 | -1 | -1 | -1 | -1 | 1 | 1 | | | | | | | | |
| 6 | | | | | | | | | 1 | 1 | 1 | 1 | -1 | -1 | -1 | -1 | | | | | | | | |
| 5 | | | | | | | | | 1 | 1 | -1 | -1 | 1 | 1 | -1 | -1 | | | | | | | | |
| 4 | | | | | | | | | 1 | 1 | 1 | 1 | 1 | 1 | 1 | 1 | | | | | | | | |
| 3 | 1 | 1 | -1 | -1 | -1 | -1 | 1 | 1 | | | | | | | | | | | | | | | | |
| 2 | 1 | 1 | 1 | 1 | -1 | -1 | -1 | -1 | | | | | | | | | | | | | | | | |
| 1 | 1 | 1 | -1 | -1 | 1 | 1 | -1 | -1 | | | | | | | | | | | | | | | | |
| 0 | 1 | 1 | 1 | 1 | 1 | 1 | 1 | 1 | | | | | | | | | | | | | | | | |

| Port | 1012 | | 1013 | | 1014 | | 1015 | | 1016 | | 1017 | | 1018 | | 1019 | | 1020 | | 1021 | | 1022 | | 1023 | |
|---|---|---|---|---|---|---|---|---|---|---|---|---|---|---|---|---|---|---|---|---|---|---|---|---|
| sc idx/sym idx | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 11 | | | | | | | | | | | | | | | | | 1 | -1 | -1 | 1 | -1 | 1 | 1 | -1 |
| 10 | | | | | | | | | | | | | | | | | 1 | -1 | 1 | -1 | -1 | 1 | -1 | 1 |
| 9 | | | | | | | | | | | | | | | | | 1 | -1 | -1 | 1 | 1 | -1 | -1 | 1 |
| 8 | | | | | | | | | | | | | | | | | 1 | -1 | 1 | -1 | 1 | -1 | 1 | -1 |
| 7 | | | | | | | | | 1 | -1 | -1 | 1 | -1 | 1 | 1 | -1 | | | | | | | | |
| 6 | | | | | | | | | 1 | -1 | 1 | -1 | -1 | 1 | -1 | 1 | | | | | | | | |
| 5 | | | | | | | | | 1 | -1 | -1 | 1 | 1 | -1 | -1 | 1 | | | | | | | | |
| 4 | | | | | | | | | 1 | -1 | 1 | -1 | 1 | -1 | 1 | -1 | | | | | | | | |
| 3 | 1 | -1 | -1 | 1 | -1 | 1 | 1 | -1 | | | | | | | | | | | | | | | | |
| 2 | 1 | -1 | 1 | -1 | -1 | 1 | -1 | 1 | | | | | | | | | | | | | | | | |
| 1 | 1 | -1 | -1 | 1 | 1 | -1 | -1 | 1 | | | | | | | | | | | | | | | | |
| 0 | 1 | -1 | 1 | -1 | 1 | -1 | 1 | -1 | | | | | | | | | | | | | | | | |

FIG. 6C

Frequency-based Increased OCC Design Pattern #2

| Port (p) | CDM group (λ) | Δ | $Wf(k')$ | | | | $Wt(l')$ | |
|---|---|---|---|---|---|---|---|---|
| | | | k'=0 | k'=1 | k'=2 | k'=3 | l'=0 | l'=1 |
| 1000 | 0 | 0 | 1 | 1 | 1 | 1 | 1 | 1 |
| 1001 | 0 | 0 | 1 | -1 | 1 | -1 | 1 | 1 |
| 1002 | 0 | 0 | 1 | 1 | -1 | -1 | 1 | 1 |
| 1003 | 0 | 0 | 1 | -1 | -1 | 1 | 1 | 1 |
| 1004 | 1 | 1 | 1 | 1 | 1 | 1 | 1 | 1 |
| 1005 | 1 | 1 | 1 | -1 | 1 | -1 | 1 | 1 |
| 1006 | 1 | 1 | 1 | 1 | -1 | -1 | 1 | 1 |
| 1007 | 1 | 1 | 1 | -1 | -1 | 1 | 1 | 1 |
| 1008 | 2 | 2 | 1 | 1 | 1 | 1 | 1 | 1 |
| 1009 | 2 | 2 | 1 | -1 | 1 | -1 | 1 | 1 |
| 1010 | 2 | 2 | 1 | 1 | -1 | -1 | 1 | 1 |
| 1011 | 2 | 2 | 1 | -1 | -1 | 1 | 1 | 1 |
| 1012 | 0 | 0 | 1 | 1 | 1 | 1 | 1 | -1 |
| 1013 | 0 | 0 | 1 | -1 | 1 | -1 | 1 | -1 |
| 1014 | 0 | 0 | 1 | 1 | -1 | -1 | 1 | -1 |
| 1015 | 0 | 0 | 1 | -1 | -1 | 1 | 1 | -1 |
| 1016 | 1 | 1 | 1 | 1 | 1 | 1 | 1 | -1 |
| 1017 | 1 | 1 | 1 | -1 | 1 | -1 | 1 | -1 |
| 1018 | 1 | 1 | 1 | 1 | -1 | -1 | 1 | -1 |
| 1019 | 1 | 1 | 1 | -1 | -1 | 1 | 1 | -1 |
| 1020 | 2 | 2 | 1 | 1 | 1 | 1 | 1 | -1 |
| 1021 | 2 | 2 | 1 | -1 | 1 | -1 | 1 | -1 |
| 1022 | 2 | 2 | 1 | 1 | -1 | -1 | 1 | -1 |
| 1023 | 2 | 2 | 1 | -1 | -1 | 1 | 1 | -1 |

*FIG. 7A*

Frequency-based Increased OCC Design Pattern #2: Single-Symbol

| Port | 1000 | | 1001 | | 1002 | | 1003 | | 1004 | | 1005 | | 1006 | | 1007 | | 1008 | | 1009 | | 1010 | | 1011 | |
|---|---|---|---|---|---|---|---|---|---|---|---|---|---|---|---|---|---|---|---|---|---|---|---|---|
| sc idx/sym idx | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 11 | | | | | | | | | | | | | | | | | 1 | | -1 | | -1 | | 1 | |
| 10 | | | | | | | | | 1 | | -1 | | -1 | | 1 | | | | | | | | | |
| 9 | 1 | | -1 | | -1 | | 1 | | | | | | | | | | | | | | | | | |
| 8 | | | | | | | | | | | | | | | | | 1 | | 1 | | -1 | | -1 | |
| 7 | | | | | | | | | 1 | | 1 | | -1 | | -1 | | | | | | | | | |
| 6 | 1 | | 1 | | -1 | | -1 | | | | | | | | | | | | | | | | | |
| 5 | | | | | | | | | | | | | | | | | 1 | | -1 | | 1 | | -1 | |
| 4 | | | | | | | | | 1 | | -1 | | 1 | | -1 | | | | | | | | | |
| 3 | 1 | | -1 | | 1 | | -1 | | | | | | | | | | | | | | | | | |
| 2 | | | | | | | | | | | | | | | | | 1 | | 1 | | 1 | | 1 | |
| 1 | | | | | | | | | 1 | | 1 | | 1 | | 1 | | | | | | | | | |
| 0 | 1 | | 1 | | 1 | | 1 | | | | | | | | | | | | | | | | | |

*FIG. 7B*

Frequency-based Increased OCC Design Pattern #2: Double-Symbol

| Port | 1000 | | 1001 | | 1002 | | 1003 | | 1004 | | 1005 | | 1006 | | 1007 | | 1008 | | 1009 | | 1010 | | 1011 | |
|---|---|---|---|---|---|---|---|---|---|---|---|---|---|---|---|---|---|---|---|---|---|---|---|---|
| sc idx/sym idx | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 11 | | | | | | | | | | | | | | | | | 1 | 1 | -1 | -1 | -1 | -1 | 1 | 1 |
| 10 | | | | | | | | | 1 | 1 | -1 | -1 | -1 | -1 | 1 | 1 | | | | | | | | |
| 9 | 1 | 1 | -1 | -1 | -1 | -1 | 1 | 1 | | | | | | | | | | | | | | | | |
| 8 | | | | | | | | | | | | | | | | | 1 | 1 | 1 | 1 | -1 | -1 | -1 | -1 |
| 7 | | | | | | | | | 1 | 1 | 1 | 1 | -1 | -1 | -1 | -1 | | | | | | | | |
| 6 | 1 | 1 | 1 | 1 | -1 | -1 | -1 | -1 | | | | | | | | | | | | | | | | |
| 5 | | | | | | | | | | | | | | | | | 1 | 1 | -1 | -1 | 1 | 1 | -1 | -1 |
| 4 | | | | | | | | | 1 | 1 | -1 | -1 | 1 | 1 | -1 | -1 | | | | | | | | |
| 3 | 1 | 1 | -1 | -1 | 1 | 1 | -1 | -1 | | | | | | | | | | | | | | | | |
| 2 | | | | | | | | | | | | | | | | | 1 | 1 | 1 | 1 | 1 | 1 | 1 | 1 |
| 1 | | | | | | | | | 1 | 1 | 1 | 1 | 1 | 1 | 1 | 1 | | | | | | | | |
| 0 | 1 | 1 | 1 | 1 | 1 | 1 | 1 | 1 | | | | | | | | | | | | | | | | |

| Port | 1012 | | 1013 | | 1014 | | 1015 | | 1016 | | 1017 | | 1018 | | 1019 | | 1020 | | 1021 | | 1022 | | 1023 | |
|---|---|---|---|---|---|---|---|---|---|---|---|---|---|---|---|---|---|---|---|---|---|---|---|---|
| sc idx/sym idx | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 11 | | | | | | | | | | | | | | | | | 1 | -1 | -1 | 1 | -1 | 1 | 1 | -1 |
| 10 | | | | | | | | | 1 | -1 | -1 | 1 | -1 | 1 | 1 | -1 | | | | | | | | |
| 9 | 1 | -1 | -1 | 1 | -1 | 1 | 1 | -1 | | | | | | | | | | | | | | | | |
| 8 | | | | | | | | | | | | | | | | | 1 | -1 | 1 | -1 | -1 | 1 | -1 | 1 |
| 7 | | | | | | | | | 1 | -1 | 1 | -1 | -1 | 1 | -1 | 1 | | | | | | | | |
| 6 | 1 | -1 | 1 | -1 | -1 | 1 | -1 | 1 | | | | | | | | | | | | | | | | |
| 5 | | | | | | | | | | | | | | | | | 1 | -1 | -1 | 1 | 1 | -1 | -1 | 1 |
| 4 | | | | | | | | | 1 | -1 | -1 | 1 | 1 | -1 | -1 | 1 | | | | | | | | |
| 3 | 1 | -1 | -1 | 1 | 1 | -1 | -1 | 1 | | | | | | | | | | | | | | | | |
| 2 | | | | | | | | | | | | | | | | | 1 | -1 | 1 | -1 | 1 | -1 | 1 | -1 |
| 1 | | | | | | | | | 1 | -1 | 1 | -1 | 1 | -1 | 1 | -1 | | | | | | | | |
| 0 | 1 | -1 | 1 | -1 | 1 | -1 | 1 | -1 | | | | | | | | | | | | | | | | |

*FIG. 7C*

Frequency-based Increased OCC Design Pattern #3

| Port (p) | CDM group (λ) | Δ | $Wf(k')$ | | | | $Wt(l')$ | |
|---|---|---|---|---|---|---|---|---|
| | | | k'=0 | k'=1 | k'=6 | k'=7 | l'=0 | l'=1 |
| 1000 | 0 | 0 | 1 | 1 | 1 | 1 | 1 | 1 |
| 1001 | 0 | 0 | 1 | -1 | 1 | -1 | 1 | 1 |
| 1002 | 0 | 0 | 1 | 1 | -1 | -1 | 1 | 1 |
| 1003 | 0 | 0 | 1 | -1 | -1 | 1 | 1 | 1 |
| 1004 | 1 | 2 | 1 | 1 | 1 | 1 | 1 | 1 |
| 1005 | 1 | 2 | 1 | -1 | 1 | -1 | 1 | 1 |
| 1006 | 1 | 2 | 1 | 1 | -1 | -1 | 1 | 1 |
| 1007 | 1 | 2 | 1 | -1 | -1 | 1 | 1 | 1 |
| 1008 | 2 | 4 | 1 | 1 | 1 | 1 | 1 | 1 |
| 1009 | 2 | 4 | 1 | -1 | 1 | -1 | 1 | 1 |
| 1010 | 2 | 4 | 1 | 1 | -1 | -1 | 1 | 1 |
| 1011 | 2 | 4 | 1 | -1 | -1 | 1 | 1 | 1 |
| 1012 | 0 | 0 | 1 | 1 | 1 | 1 | 1 | -1 |
| 1013 | 0 | 0 | 1 | -1 | 1 | -1 | 1 | -1 |
| 1014 | 0 | 0 | 1 | 1 | -1 | -1 | 1 | -1 |
| 1015 | 0 | 0 | 1 | -1 | -1 | 1 | 1 | -1 |
| 1016 | 1 | 2 | 1 | 1 | 1 | 1 | 1 | -1 |
| 1017 | 1 | 2 | 1 | -1 | 1 | -1 | 1 | -1 |
| 1018 | 1 | 2 | 1 | 1 | -1 | -1 | 1 | -1 |
| 1019 | 1 | 2 | 1 | -1 | -1 | 1 | 1 | -1 |
| 1020 | 2 | 4 | 1 | 1 | 1 | 1 | 1 | -1 |
| 1021 | 2 | 4 | 1 | -1 | 1 | -1 | 1 | -1 |
| 1022 | 2 | 4 | 1 | 1 | -1 | -1 | 1 | -1 |
| 1023 | 2 | 4 | 1 | -1 | -1 | 1 | 1 | -1 |

*FIG. 8A*

Frequency-based Increased OCC Design Pattern #3: Single-Symbol

| Port | 1000 | | 1001 | | 1002 | | 1003 | | 1004 | | 1005 | | 1006 | | 1007 | | 1008 | | 1009 | | 1010 | | 1011 | |
|---|---|---|---|---|---|---|---|---|---|---|---|---|---|---|---|---|---|---|---|---|---|---|---|---|
| sc idx/sym idx | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 11 | | | | | | | | | | | | | | | | | 1 | | -1 | | -1 | | 1 | |
| 10 | | | | | | | | | | | | | | | | | 1 | | 1 | | -1 | | -1 | |
| 9 | | | | | | | | | 1 | | -1 | | -1 | | 1 | | | | | | | | | |
| 8 | | | | | | | | | 1 | | 1 | | -1 | | -1 | | | | | | | | | |
| 7 | 1 | | -1 | | -1 | | 1 | | | | | | | | | | | | | | | | | |
| 6 | 1 | | 1 | | -1 | | -1 | | | | | | | | | | | | | | | | | |
| 5 | | | | | | | | | | | | | | | | | 1 | | -1 | | 1 | | -1 | |
| 4 | | | | | | | | | | | | | | | | | 1 | | 1 | | 1 | | 1 | |
| 3 | | | | | | | | | 1 | | -1 | | 1 | | -1 | | | | | | | | | |
| 2 | | | | | | | | | 1 | | 1 | | 1 | | 1 | | | | | | | | | |
| 1 | 1 | | -1 | | 1 | | -1 | | | | | | | | | | | | | | | | | |
| 0 | 1 | | 1 | | 1 | | 1 | | | | | | | | | | | | | | | | | |

FIG. 8B

Frequency-based Increased OCC Design Pattern #3: Double-Symbol

| Port | 1000 | | 1001 | | 1002 | | 1003 | | 1004 | | 1005 | | 1006 | | 1007 | | 1008 | | 1009 | | 1010 | | 1011 | |
|---|---|---|---|---|---|---|---|---|---|---|---|---|---|---|---|---|---|---|---|---|---|---|---|---|
| sc idx/sym idx | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 11 | | | | | | | | | | | | | | | | | 1 | 1 | -1 | -1 | -1 | -1 | 1 | 1 |
| 10 | | | | | | | | | | | | | | | | | 1 | 1 | 1 | 1 | -1 | -1 | -1 | -1 |
| 9 | | | | | | | | | 1 | 1 | -1 | -1 | -1 | -1 | 1 | 1 | | | | | | | | |
| 8 | | | | | | | | | 1 | 1 | 1 | 1 | -1 | -1 | -1 | -1 | | | | | | | | |
| 7 | 1 | 1 | -1 | -1 | -1 | -1 | 1 | 1 | | | | | | | | | | | | | | | | |
| 6 | 1 | 1 | 1 | 1 | -1 | -1 | -1 | -1 | | | | | | | | | | | | | | | | |
| 5 | | | | | | | | | | | | | | | | | 1 | 1 | -1 | -1 | 1 | 1 | -1 | -1 |
| 4 | | | | | | | | | | | | | | | | | 1 | 1 | 1 | 1 | 1 | 1 | 1 | 1 |
| 3 | | | | | | | | | 1 | 1 | -1 | -1 | 1 | 1 | -1 | -1 | | | | | | | | |
| 2 | | | | | | | | | 1 | 1 | 1 | 1 | 1 | 1 | 1 | 1 | | | | | | | | |
| 1 | 1 | 1 | -1 | -1 | 1 | 1 | -1 | -1 | | | | | | | | | | | | | | | | |
| 0 | 1 | 1 | 1 | 1 | 1 | 1 | 1 | 1 | | | | | | | | | | | | | | | | |

| Port | 1012 | | 1013 | | 1014 | | 1015 | | 1016 | | 1017 | | 1018 | | 1019 | | 1020 | | 1021 | | 1022 | | 1023 | |
|---|---|---|---|---|---|---|---|---|---|---|---|---|---|---|---|---|---|---|---|---|---|---|---|---|
| sc idx/sym idx | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 11 | | | | | | | | | | | | | | | | | 1 | -1 | -1 | 1 | -1 | 1 | 1 | -1 |
| 10 | | | | | | | | | | | | | | | | | 1 | -1 | 1 | -1 | -1 | 1 | -1 | 1 |
| 9 | | | | | | | | | 1 | -1 | -1 | 1 | -1 | 1 | 1 | -1 | | | | | | | | |
| 8 | | | | | | | | | 1 | -1 | 1 | -1 | -1 | 1 | -1 | 1 | | | | | | | | |
| 7 | 1 | -1 | -1 | 1 | -1 | 1 | 1 | -1 | | | | | | | | | | | | | | | | |
| 6 | 1 | -1 | 1 | -1 | -1 | 1 | -1 | 1 | | | | | | | | | | | | | | | | |
| 5 | | | | | | | | | | | | | | | | | 1 | -1 | -1 | 1 | 1 | -1 | -1 | 1 |
| 4 | | | | | | | | | | | | | | | | | 1 | -1 | 1 | -1 | 1 | -1 | 1 | -1 |
| 3 | | | | | | | | | 1 | -1 | -1 | 1 | 1 | -1 | -1 | 1 | | | | | | | | |
| 2 | | | | | | | | | 1 | -1 | 1 | -1 | 1 | -1 | 1 | -1 | | | | | | | | |
| 1 | 1 | -1 | -1 | 1 | 1 | -1 | -1 | 1 | | | | | | | | | | | | | | | | |
| 0 | 1 | -1 | 1 | -1 | 1 | -1 | 1 | -1 | | | | | | | | | | | | | | | | |

*FIG. 8C*

Frequency-based Increased OCC Design Pattern #4

| Port (p) | CDM group (λ) | Δ | $Wf(k')$ | | | | | | $Wt(l')$ | |
|---|---|---|---|---|---|---|---|---|---|---|
| | | | k'=0 | k'=1 | k'=2 | k'=3 | k'=4 | k'=5 | l'=0 | l'=1 |
| 1000 | 0 | 0 | 1 | 1 | 1 | 1 | 1 | 1 | 1 | 1 |
| 1001 | 0 | 0 | 1 | $\omega$ | $\omega^2$ | $\omega^3$ | $\omega^4$ | $\omega^5$ | 1 | 1 |
| 1002 | 0 | 0 | 1 | $\omega^2$ | $\omega^4$ | $\omega^6$ | $\omega^8$ | $\omega^{10}$ | 1 | 1 |
| 1003 | 0 | 0 | 1 | $\omega^3$ | $\omega^6$ | $\omega^9$ | $\omega^{12}$ | $\omega^{15}$ | 1 | 1 |
| 1004 | 1 | 1 | 1 | 1 | 1 | 1 | 1 | 1 | 1 | 1 |
| 1005 | 1 | 1 | 1 | $\omega$ | $\omega^2$ | $\omega^3$ | $\omega^4$ | $\omega^5$ | 1 | 1 |
| 1006 | 1 | 1 | 1 | $\omega^2$ | $\omega^4$ | $\omega^6$ | $\omega^8$ | $\omega^{10}$ | 1 | 1 |
| 1007 | 1 | 1 | 1 | $\omega^3$ | $\omega^6$ | $\omega^9$ | $\omega^{12}$ | $\omega^{15}$ | 1 | 1 |
| 1008 | 0 | 0 | 1 | 1 | 1 | 1 | 1 | 1 | 1 | -1 |
| 1009 | 0 | 0 | 1 | $\omega$ | $\omega^2$ | $\omega^3$ | $\omega^4$ | $\omega^5$ | 1 | -1 |
| 1010 | 0 | 0 | 1 | $\omega^2$ | $\omega^4$ | $\omega^6$ | $\omega^8$ | $\omega^{10}$ | 1 | -1 |
| 1011 | 0 | 0 | 1 | $\omega^3$ | $\omega^6$ | $\omega^9$ | $\omega^{12}$ | $\omega^{15}$ | 1 | -1 |
| 1012 | 1 | 1 | 1 | 1 | 1 | 1 | 1 | 1 | 1 | -1 |
| 1013 | 1 | 1 | 1 | $\omega$ | $\omega^2$ | $\omega^3$ | $\omega^4$ | $\omega^5$ | 1 | -1 |
| 1014 | 1 | 1 | 1 | $\omega^2$ | $\omega^4$ | $\omega^6$ | $\omega^8$ | $\omega^{10}$ | 1 | -1 |
| 1015 | 1 | 1 | 1 | $\omega^3$ | $\omega^6$ | $\omega^9$ | $\omega^{12}$ | $\omega^{15}$ | 1 | -1 |

FIG. 9A

Frequency-based Increased OCC Design Pattern #4: Single-Symbol

| Port | 1000 | | 1001 | | 1002 | | 1003 | | 1004 | | 1005 | | 1006 | | 1007 | |
|---|---|---|---|---|---|---|---|---|---|---|---|---|---|---|---|---|
| sc idx/sym idx | 0 | 1 | 0 | 1 | 0 | 1 | 0 | 1 | 0 | 1 | 0 | 1 | 0 | 1 | 0 | 1 |
| 11 | | | | | | | | | 1 | | ω^5 | | ω^10 | | ω^15 | |
| 10 | 1 | | ω^5 | | ω^10 | | ω^15 | | | | | | | | | |
| 9 | | | | | | | | | 1 | | ω^4 | | ω^8 | | ω^12 | |
| 8 | 1 | | ω^4 | | ω^8 | | ω^12 | | | | | | | | | |
| 7 | | | | | | | | | 1 | | ω^3 | | ω^6 | | ω^9 | |
| 6 | 1 | | ω^3 | | ω^6 | | ω^9 | | | | | | | | | |
| 5 | | | | | | | | | 1 | | ω^2 | | ω^4 | | ω^6 | |
| 4 | 1 | | ω^2 | | ω^4 | | ω^6 | | | | | | | | | |
| 3 | | | | | | | | | 1 | | ω | | ω^2 | | ω^3 | |
| 2 | 1 | | ω | | ω^2 | | ω^3 | | | | | | | | | |
| 1 | | | | | | | | | 1 | | 1 | | 1 | | 1 | |
| 0 | 1 | | 1 | | 1 | | 1 | | | | | | | | | |

*FIG. 9B*

Frequency-based Increased OCC Design Pattern #4: Double-Symbol

| Port | 1000 | | 1001 | | 1002 | | 1003 | | 1004 | | 1005 | | 1006 | | 1007 | |
|---|---|---|---|---|---|---|---|---|---|---|---|---|---|---|---|---|
| sc idx/sym idx | 0 | 1 | 0 | 1 | 0 | 1 | 0 | 1 | 0 | 1 | 0 | 1 | 0 | 1 | 0 | 1 |
| 11 | | | | | | | | | 1 | 1 | $\omega^5$ | $\omega^5$ | $\omega^{10}$ | $\omega^{10}$ | $\omega^{15}$ | $\omega^{15}$ |
| 10 | 1 | 1 | $\omega^5$ | $\omega^5$ | $\omega^{10}$ | $\omega^{10}$ | $\omega^{15}$ | $\omega^{15}$ | | | | | | | | |
| 9 | | | | | | | | | 1 | 1 | $\omega^4$ | $\omega^4$ | $\omega^8$ | $\omega^8$ | $\omega^{12}$ | $\omega^{12}$ |
| 8 | 1 | 1 | $\omega^4$ | $\omega^4$ | $\omega^8$ | $\omega^8$ | $\omega^{12}$ | $\omega^{12}$ | | | | | | | | |
| 7 | | | | | | | | | 1 | 1 | $\omega^3$ | $\omega^3$ | $\omega^6$ | $\omega^6$ | $\omega^9$ | $\omega^9$ |
| 6 | 1 | 1 | $\omega^3$ | $\omega^3$ | $\omega^6$ | $\omega^6$ | $\omega^9$ | $\omega^9$ | | | | | | | | |
| 5 | | | | | | | | | 1 | 1 | $\omega^2$ | $\omega^2$ | $\omega^4$ | $\omega^4$ | $\omega^6$ | $\omega^6$ |
| 4 | 1 | 1 | $\omega^2$ | $\omega^2$ | $\omega^4$ | $\omega^4$ | $\omega^6$ | $\omega^6$ | | | | | | | | |
| 3 | | | | | | | | | 1 | 1 | $\omega$ | $\omega$ | $\omega^2$ | $\omega^2$ | $\omega^3$ | $\omega^3$ |
| 2 | 1 | 1 | $\omega$ | $\omega$ | $\omega^2$ | $\omega^2$ | $\omega^3$ | $\omega^3$ | | | | | | | | |
| 1 | | | | | | | | | 1 | 1 | 1 | 1 | 1 | 1 | 1 | 1 |
| 0 | 1 | 1 | 1 | 1 | 1 | 1 | 1 | 1 | | | | | | | | |

| Port | 1008 | | 1009 | | 1010 | | 1011 | | 1012 | | 1013 | | 1014 | | 1015 | |
|---|---|---|---|---|---|---|---|---|---|---|---|---|---|---|---|---|
| sc idx/sym idx | 0 | 1 | 0 | 1 | 0 | 1 | 0 | 1 | 0 | 1 | 0 | 1 | 0 | 1 | 0 | 1 |
| 11 | | | | | | | | | 1 | -1 | $\omega^5$ | $-\omega^5$ | $\omega^{10}$ | $-\omega^{10}$ | $\omega^{15}$ | $-\omega^{15}$ |
| 10 | 1 | -1 | $\omega^5$ | $-\omega^5$ | $\omega^{10}$ | $-\omega^{10}$ | $\omega^{15}$ | $-\omega^{15}$ | | | | | | | | |
| 9 | | | | | | | | | 1 | -1 | $\omega^4$ | $-\omega^4$ | $\omega^8$ | $-\omega^8$ | $\omega^{12}$ | $-\omega^{12}$ |
| 8 | 1 | -1 | $\omega^4$ | $-\omega^4$ | $\omega^8$ | $-\omega^8$ | $\omega^{12}$ | $-\omega^{12}$ | | | | | | | | |
| 7 | | | | | | | | | 1 | -1 | $\omega^3$ | $-\omega^3$ | $\omega^6$ | $-\omega^6$ | $\omega^9$ | $-\omega^9$ |
| 6 | 1 | -1 | $\omega^3$ | $-\omega^3$ | $\omega^6$ | $-\omega^6$ | $\omega^9$ | $-\omega^9$ | | | | | | | | |
| 5 | | | | | | | | | 1 | -1 | $\omega^2$ | $-\omega^2$ | $\omega^4$ | $-\omega^4$ | $\omega^6$ | $-\omega^6$ |
| 4 | 1 | -1 | $\omega^2$ | $-\omega^2$ | $\omega^4$ | $-\omega^4$ | $\omega^6$ | $-\omega^6$ | | | | | | | | |
| 3 | | | | | | | | | 1 | -1 | $\omega$ | $-\omega$ | $\omega^2$ | $-\omega^2$ | $\omega^3$ | $-\omega^3$ |
| 2 | 1 | -1 | $\omega$ | $-\omega$ | $\omega^2$ | $-\omega^2$ | $\omega^3$ | $-\omega^3$ | | | | | | | | |
| 1 | | | | | | | | | 1 | -1 | 1 | -1 | 1 | -1 | 1 | -1 |
| 0 | 1 | -1 | 1 | -1 | 1 | -1 | 1 | -1 | | | | | | | | |

*FIG. 9C*

Time-based Increased OCC Design Pattern #1

| Port (p) | CDM group (λ) | Δ | $Wf(k')$ | | $Wt(l')$ | | | |
|---|---|---|---|---|---|---|---|---|
| | | | k'=0 | k'=1 | l'=0 | l'=1 | l'=2 | l'=3 |
| 1000 | 0 | 0 | 1 | 1 | 1 | 1 | 1 | 1 |
| 1001 | 0 | 0 | 1 | -1 | 1 | 1 | 1 | 1 |
| 1002 | 1 | 1 | 1 | 1 | 1 | 1 | 1 | 1 |
| 1003 | 1 | 1 | 1 | -1 | 1 | 1 | 1 | 1 |
| 1004 | 0 | 0 | 1 | 1 | 1 | -1 | 1 | -1 |
| 1005 | 0 | 0 | 1 | -1 | 1 | -1 | 1 | -1 |
| 1006 | 1 | 1 | 1 | 1 | 1 | -1 | 1 | -1 |
| 1007 | 1 | 1 | 1 | -1 | 1 | -1 | 1 | -1 |
| 1008 | 2 | 0 | 1 | 1 | 1 | 1 | -1 | -1 |
| 1009 | 2 | 0 | 1 | -1 | 1 | 1 | -1 | -1 |
| 1010 | 3 | 1 | 1 | 1 | 1 | 1 | -1 | -1 |
| 1011 | 3 | 1 | 1 | -1 | 1 | 1 | -1 | -1 |
| 1012 | 2 | 0 | 1 | 1 | 1 | -1 | -1 | 1 |
| 1013 | 2 | 0 | 1 | -1 | 1 | -1 | -1 | 1 |
| 1014 | 3 | 1 | 1 | 1 | 1 | -1 | -1 | 1 |
| 1015 | 3 | 1 | 1 | -1 | 1 | -1 | -1 | 1 |

FIG. 11A

Time-based Increased OCC Design Pattern #1: Single-Symbol or Double-Symbol

| Port | 1000 | | | | 1001 | | | | 1002 | | | | 1003 | | | | 1004 | | | | 1005 | | | | 1006 | | | | 1007 | | | |
|---|---|---|---|---|---|---|---|---|---|---|---|---|---|---|---|---|---|---|---|---|---|---|---|---|---|---|---|---|---|---|---|---|
| sc idx/sym idx | 0 | 1 | 2 | 3 | 0 | 1 | 2 | 3 | 0 | 1 | 2 | 3 | 0 | 1 | 2 | 3 | 0 | 1 | 2 | 3 | 0 | 1 | 2 | 3 | 0 | 1 | 2 | 3 | 0 | 1 | 2 | 3 |
| 11 | | | | | | | | | 1 | 1 | 1 | 1 | -1 | -1 | -1 | -1 | | | | | | | | | 1 | -1 | 1 | -1 | -1 | 1 | -1 | 1 |
| 10 | 1 | 1 | 1 | 1 | -1 | -1 | -1 | -1 | | | | | | | | | 1 | -1 | 1 | -1 | -1 | 1 | -1 | 1 | | | | | | | | |
| 9 | | | | | | | | | 1 | 1 | 1 | 1 | 1 | 1 | 1 | 1 | | | | | | | | | 1 | -1 | 1 | -1 | 1 | -1 | 1 | -1 |
| 8 | 1 | 1 | 1 | 1 | 1 | 1 | 1 | 1 | | | | | | | | | 1 | -1 | 1 | -1 | 1 | -1 | 1 | -1 | | | | | | | | |
| 7 | | | | | | | | | 1 | 1 | 1 | 1 | -1 | -1 | -1 | -1 | | | | | | | | | 1 | -1 | 1 | -1 | -1 | 1 | -1 | 1 |
| 6 | 1 | 1 | 1 | 1 | -1 | -1 | -1 | -1 | | | | | | | | | 1 | -1 | 1 | -1 | -1 | 1 | -1 | 1 | | | | | | | | |
| 5 | | | | | | | | | 1 | 1 | 1 | 1 | 1 | 1 | 1 | 1 | | | | | | | | | 1 | -1 | 1 | -1 | 1 | -1 | 1 | -1 |
| 4 | 1 | 1 | 1 | 1 | 1 | 1 | 1 | 1 | | | | | | | | | 1 | -1 | 1 | -1 | 1 | -1 | 1 | -1 | | | | | | | | |
| 3 | | | | | | | | | 1 | 1 | 1 | 1 | -1 | -1 | -1 | -1 | | | | | | | | | 1 | -1 | 1 | -1 | -1 | 1 | -1 | 1 |
| 2 | 1 | 1 | 1 | 1 | -1 | -1 | -1 | -1 | | | | | | | | | 1 | -1 | 1 | -1 | -1 | 1 | -1 | 1 | | | | | | | | |
| 1 | | | | | | | | | 1 | 1 | 1 | 1 | 1 | 1 | 1 | 1 | | | | | | | | | 1 | -1 | 1 | -1 | 1 | -1 | 1 | -1 |
| 0 | 1 | 1 | 1 | 1 | 1 | 1 | 1 | 1 | | | | | | | | | 1 | -1 | 1 | -1 | 1 | -1 | 1 | -1 | | | | | | | | |

| Port | 1008 | | | | 1009 | | | | 1010 | | | | 1011 | | | | 1012 | | | | 1013 | | | | 1014 | | | | 1015 | | | |
|---|---|---|---|---|---|---|---|---|---|---|---|---|---|---|---|---|---|---|---|---|---|---|---|---|---|---|---|---|---|---|---|---|
| sc idx/sym idx | 0 | 1 | 2 | 3 | 0 | 1 | 2 | 3 | 0 | 1 | 2 | 3 | 0 | 1 | 2 | 3 | 0 | 1 | 2 | 3 | 0 | 1 | 2 | 3 | 0 | 1 | 2 | 3 | 0 | 1 | 2 | 3 |
| 11 | | | | | | | | | 1 | 1 | -1 | -1 | -1 | -1 | 1 | 1 | | | | | | | | | 1 | -1 | -1 | 1 | -1 | 1 | 1 | -1 |
| 10 | 1 | 1 | -1 | -1 | -1 | -1 | 1 | 1 | | | | | | | | | 1 | -1 | -1 | 1 | -1 | 1 | 1 | -1 | | | | | | | | |
| 9 | | | | | | | | | 1 | 1 | -1 | -1 | 1 | 1 | -1 | -1 | | | | | | | | | 1 | -1 | -1 | 1 | 1 | -1 | -1 | 1 |
| 8 | 1 | 1 | -1 | -1 | 1 | 1 | -1 | -1 | | | | | | | | | 1 | -1 | -1 | 1 | 1 | -1 | -1 | 1 | | | | | | | | |
| 7 | | | | | | | | | 1 | 1 | -1 | -1 | -1 | -1 | 1 | 1 | | | | | | | | | 1 | -1 | -1 | 1 | -1 | 1 | 1 | -1 |
| 6 | 1 | 1 | -1 | -1 | -1 | -1 | 1 | 1 | | | | | | | | | 1 | -1 | -1 | 1 | -1 | 1 | 1 | -1 | | | | | | | | |
| 5 | | | | | | | | | 1 | 1 | -1 | -1 | 1 | 1 | -1 | -1 | | | | | | | | | 1 | -1 | -1 | 1 | 1 | -1 | -1 | 1 |
| 4 | 1 | 1 | -1 | -1 | 1 | 1 | -1 | -1 | | | | | | | | | 1 | -1 | -1 | 1 | 1 | -1 | -1 | 1 | | | | | | | | |
| 3 | | | | | | | | | 1 | 1 | -1 | -1 | -1 | -1 | 1 | 1 | | | | | | | | | 1 | -1 | -1 | 1 | -1 | 1 | 1 | -1 |
| 2 | 1 | 1 | -1 | -1 | -1 | -1 | 1 | 1 | | | | | | | | | 1 | -1 | -1 | 1 | -1 | 1 | 1 | -1 | | | | | | | | |
| 1 | | | | | | | | | 1 | 1 | -1 | -1 | 1 | 1 | -1 | -1 | | | | | | | | | 1 | -1 | -1 | 1 | 1 | -1 | -1 | 1 |
| 0 | 1 | 1 | -1 | -1 | 1 | 1 | -1 | -1 | | | | | | | | | 1 | -1 | -1 | 1 | 1 | -1 | -1 | 1 | | | | | | | | |

FIG. 11B

Frequency-based Increased OCC Design Pattern #2

| Port (p) | CDM group (λ) | Δ | $Wf(k')$ | | $Wt(l')$ | | | |
|---|---|---|---|---|---|---|---|---|
| | | | k'=0 | k'=1 | l'=0 | l'=1 | l'=2 | l'=3 |
| 1000 | 0 | 0 | 1 | 1 | 1 | 1 | 1 | 1 |
| 1001 | 0 | 0 | 1 | -1 | 1 | 1 | 1 | 1 |
| 1002 | 1 | 2 | 1 | 1 | 1 | 1 | 1 | 1 |
| 1003 | 1 | 2 | 1 | -1 | 1 | 1 | 1 | 1 |
| 1004 | 2 | 4 | 1 | 1 | 1 | 1 | 1 | 1 |
| 1005 | 2 | 4 | 1 | -1 | 1 | 1 | 1 | 1 |
| 1006 | 0 | 0 | 1 | 1 | 1 | -1 | 1 | -1 |
| 1007 | 0 | 0 | 1 | -1 | 1 | -1 | 1 | -1 |
| 1008 | 1 | 2 | 1 | 1 | 1 | -1 | 1 | -1 |
| 1009 | 1 | 2 | 1 | -1 | 1 | -1 | 1 | -1 |
| 1010 | 2 | 4 | 1 | 1 | 1 | -1 | 1 | -1 |
| 1011 | 2 | 4 | 1 | -1 | 1 | -1 | 1 | -1 |
| 1012 | 0 | 0 | 1 | 1 | 1 | 1 | -1 | -1 |
| 1013 | 0 | 0 | 1 | -1 | 1 | 1 | -1 | -1 |
| 1014 | 1 | 2 | 1 | 1 | 1 | 1 | -1 | -1 |
| 1015 | 1 | 2 | 1 | -1 | 1 | 1 | -1 | -1 |
| 1016 | 2 | 4 | 1 | 1 | 1 | 1 | -1 | -1 |
| 1017 | 2 | 4 | 1 | -1 | 1 | 1 | -1 | -1 |
| 1018 | 0 | 0 | 1 | 1 | 1 | -1 | -1 | 1 |
| 1019 | 0 | 0 | 1 | -1 | 1 | -1 | -1 | 1 |
| 1020 | 1 | 2 | 1 | 1 | 1 | -1 | -1 | 1 |
| 1021 | 1 | 2 | 1 | -1 | 1 | -1 | -1 | 1 |
| 1022 | 2 | 4 | 1 | 1 | 1 | -1 | -1 | 1 |
| 1023 | 2 | 4 | 1 | -1 | 1 | -1 | -1 | 1 |

*FIG. 12A*

Time-based Increased OCC Design Pattern #2: Single-Symbol or Double-Symbol

| Port | 1000 | | | | 1001 | | | | 1002 | | | | 1003 | | | |
|---|---|---|---|---|---|---|---|---|---|---|---|---|---|---|---|---|
| sc idx/sym idx | 0 | 1 | 2 | 3 | 0 | 1 | 2 | 3 | 0 | 1 | 2 | 3 | 0 | 1 | 2 | 3 |
| 11 | | | | | | | | | | | | | | | | |
| 10 | | | | | | | | | | | | | | | | |
| 9 | | | | | | | | | 1 | 1 | 1 | 1 | -1 | -1 | -1 | -1 |
| 8 | | | | | | | | | 1 | 1 | 1 | 1 | 1 | 1 | 1 | 1 |
| 7 | 1 | 1 | 1 | 1 | -1 | -1 | -1 | -1 | | | | | | | | |
| 6 | 1 | 1 | 1 | 1 | 1 | 1 | 1 | 1 | | | | | | | | |
| 5 | | | | | | | | | | | | | | | | |
| 4 | | | | | | | | | | | | | | | | |
| 3 | | | | | | | | | 1 | 1 | 1 | 1 | -1 | -1 | -1 | -1 |
| 2 | | | | | | | | | 1 | 1 | 1 | 1 | 1 | 1 | 1 | 1 |
| 1 | 1 | 1 | 1 | 1 | -1 | -1 | -1 | -1 | | | | | | | | |
| 0 | 1 | 1 | 1 | 1 | 1 | 1 | 1 | 1 | | | | | | | | |

| Port | 1004 | | | | 1005 | | | | 1006 | | | | 1007 | | | |
|---|---|---|---|---|---|---|---|---|---|---|---|---|---|---|---|---|
| sc idx/sym idx | 0 | 1 | 2 | 3 | 0 | 1 | 2 | 3 | 0 | 1 | 2 | 3 | 0 | 1 | 2 | 3 |
| 11 | 1 | 1 | 1 | 1 | -1 | -1 | -1 | -1 | | | | | | | | |
| 10 | 1 | 1 | 1 | 1 | 1 | 1 | 1 | 1 | | | | | | | | |
| 9 | | | | | | | | | | | | | | | | |
| 8 | | | | | | | | | | | | | | | | |
| 7 | | | | | | | | | 1 | -1 | 1 | -1 | -1 | 1 | -1 | 1 |
| 6 | | | | | | | | | 1 | -1 | 1 | -1 | 1 | -1 | 1 | -1 |
| 5 | 1 | 1 | 1 | 1 | -1 | -1 | -1 | -1 | | | | | | | | |
| 4 | 1 | 1 | 1 | 1 | 1 | 1 | 1 | 1 | | | | | | | | |
| 3 | | | | | | | | | | | | | | | | |
| 2 | | | | | | | | | | | | | | | | |
| 1 | | | | | | | | | 1 | -1 | 1 | -1 | -1 | 1 | -1 | 1 |
| 0 | | | | | | | | | 1 | -1 | 1 | -1 | 1 | -1 | 1 | -1 |

| Port | 1008 | | | | 1009 | | | | 1010 | | | | 1011 | | | |
|---|---|---|---|---|---|---|---|---|---|---|---|---|---|---|---|---|
| sc idx/sym idx | 0 | 1 | 2 | 3 | 0 | 1 | 2 | 3 | 0 | 1 | 2 | 3 | 0 | 1 | 2 | 3 |
| 11 | | | | | | | | | 1 | -1 | 1 | -1 | -1 | 1 | -1 | 1 |
| 10 | | | | | | | | | 1 | -1 | 1 | -1 | 1 | -1 | 1 | -1 |
| 9 | 1 | -1 | 1 | -1 | -1 | 1 | -1 | 1 | | | | | | | | |
| 8 | 1 | -1 | 1 | -1 | 1 | -1 | 1 | -1 | | | | | | | | |
| 7 | | | | | | | | | | | | | | | | |
| 6 | | | | | | | | | | | | | | | | |
| 5 | | | | | | | | | 1 | -1 | 1 | -1 | -1 | 1 | -1 | 1 |
| 4 | | | | | | | | | 1 | -1 | 1 | -1 | 1 | -1 | 1 | -1 |
| 3 | 1 | -1 | 1 | -1 | -1 | 1 | -1 | 1 | | | | | | | | |
| 2 | 1 | -1 | 1 | -1 | 1 | -1 | 1 | -1 | | | | | | | | |
| 1 | | | | | | | | | | | | | | | | |
| 0 | | | | | | | | | | | | | | | | |

| Port | 1012 | | | | 1013 | | | | 1014 | | | | 1015 | | | |
|---|---|---|---|---|---|---|---|---|---|---|---|---|---|---|---|---|
| sc idx/sym idx | 0 | 1 | 2 | 3 | 0 | 1 | 2 | 3 | 0 | 1 | 2 | 3 | 0 | 1 | 2 | 3 |
| 11 | | | | | | | | | | | | | | | | |
| 10 | | | | | | | | | | | | | | | | |
| 9 | | | | | | | | | 1 | 1 | -1 | -1 | -1 | -1 | 1 | 1 |
| 8 | | | | | | | | | 1 | 1 | -1 | -1 | 1 | 1 | -1 | -1 |
| 7 | 1 | 1 | -1 | -1 | -1 | -1 | 1 | 1 | | | | | | | | |
| 6 | 1 | 1 | -1 | -1 | 1 | 1 | -1 | -1 | | | | | | | | |
| 5 | | | | | | | | | | | | | | | | |
| 4 | | | | | | | | | | | | | | | | |
| 3 | | | | | | | | | 1 | 1 | -1 | -1 | -1 | -1 | 1 | 1 |
| 2 | | | | | | | | | 1 | 1 | -1 | -1 | 1 | 1 | -1 | -1 |
| 1 | 1 | 1 | -1 | -1 | -1 | -1 | 1 | 1 | | | | | | | | |
| 0 | 1 | 1 | -1 | -1 | 1 | 1 | -1 | -1 | | | | | | | | |

| Port | 1016 | | | | 1017 | | | | 1018 | | | | 1019 | | | |
|---|---|---|---|---|---|---|---|---|---|---|---|---|---|---|---|---|
| sc idx/sym idx | 0 | 1 | 2 | 3 | 0 | 1 | 2 | 3 | 0 | 1 | 2 | 3 | 0 | 1 | 2 | 3 |
| 11 | 1 | 1 | -1 | -1 | -1 | -1 | 1 | 1 | | | | | | | | |
| 10 | 1 | 1 | -1 | -1 | 1 | 1 | -1 | -1 | | | | | | | | |
| 9 | | | | | | | | | | | | | | | | |
| 8 | | | | | | | | | | | | | | | | |
| 7 | | | | | | | | | 1 | -1 | -1 | 1 | -1 | 1 | 1 | -1 |
| 6 | | | | | | | | | 1 | -1 | -1 | 1 | 1 | -1 | -1 | 1 |
| 5 | 1 | 1 | -1 | -1 | -1 | -1 | 1 | 1 | | | | | | | | |
| 4 | 1 | 1 | -1 | -1 | 1 | 1 | -1 | -1 | | | | | | | | |
| 3 | | | | | | | | | | | | | | | | |
| 2 | | | | | | | | | | | | | | | | |
| 1 | | | | | | | | | 1 | -1 | -1 | 1 | -1 | 1 | 1 | -1 |
| 0 | | | | | | | | | 1 | -1 | -1 | 1 | 1 | -1 | -1 | 1 |

| Port | 1020 | | | | 1021 | | | | 1022 | | | | 1023 | | | |
|---|---|---|---|---|---|---|---|---|---|---|---|---|---|---|---|---|
| sc idx/sym idx | 0 | 1 | 2 | 3 | 0 | 1 | 2 | 3 | 0 | 1 | 2 | 3 | 0 | 1 | 2 | 3 |
| 11 | | | | | | | | | 1 | -1 | -1 | 1 | -1 | 1 | 1 | -1 |
| 10 | | | | | | | | | 1 | -1 | -1 | 1 | 1 | -1 | -1 | 1 |
| 9 | 1 | -1 | -1 | 1 | -1 | 1 | 1 | -1 | | | | | | | | |
| 8 | 1 | -1 | -1 | 1 | 1 | -1 | -1 | 1 | | | | | | | | |
| 7 | | | | | | | | | | | | | | | | |
| 6 | | | | | | | | | | | | | | | | |
| 5 | | | | | | | | | 1 | -1 | -1 | 1 | -1 | 1 | 1 | -1 |
| 4 | | | | | | | | | 1 | -1 | -1 | 1 | 1 | -1 | -1 | 1 |
| 3 | 1 | -1 | -1 | 1 | -1 | 1 | 1 | -1 | | | | | | | | |
| 2 | 1 | -1 | -1 | 1 | 1 | -1 | -1 | 1 | | | | | | | | |
| 1 | | | | | | | | | | | | | | | | |
| 0 | | | | | | | | | | | | | | | | |

FIG. 12B

METHOD AND APPARATUS FOR INCREASING SYSTEM CAPACITY OF DEMODULATION REFERENCE SIGNALS

INCORPORATION BY REFERENCE

This present disclosure claims the benefits of U.S. Provisional Application No. 63/330,822, filed on Apr. 14, 2022, and U.S. Provisional Application No. 63/370,807, filed on Aug. 9, 2022. The entire disclosures of the prior applications are incorporated herein by reference in their entireties.

TECHNICAL FIELD

The present disclosure relates to wireless communications, and specifically to a demodulation reference signal design.

BACKGROUND

In wireless communications, a transmitter modulates a sequence of information bits and constructs complex-valued symbols to be transmitted to a receiver through a wireless channel. The wireless channel can change the transmitted symbols before the receiver receives the transmitted symbols according to channel coefficients. However, the channel coefficients themselves can change over time, making it more challenging for the receiver to demodulate the received symbols. To estimate the channel coefficients, reference signals can be used between the transmitter and the receiver.

SUMMARY

Aspects of the disclosure provide a method for wireless communication. The method includes determining, by processing circuitry of an apparatus, one or more antenna ports of the apparatus for data transmission. The method further includes generating, by the processing circuitry of the apparatus and for each of the one or more antenna ports, a respective demodulation reference signal (DMRS) based on one of a first DMRS pattern, a second DMRS pattern, a third DMRS pattern, and a fourth DMRS pattern. The first DMRS pattern includes four code division multiplexing (CDM) groups each comprising a length-2 orthogonal cover code (OCC), the second DMRS pattern includes six CDM groups each comprising a length-2 OCC, the third DMRS pattern includes three CDM groups each comprising a length-4 OCC, and the fourth DMRS pattern includes two CDM groups each comprising a length-6 OCC. The method includes transmitting, by the one or more antenna ports, the one or more DMRSs.

According to embodiments of the disclosure, the length-2 OCC of the first DMRS pattern is repetitive at an interval of eight resource elements (REs) in frequency domain. In an embodiment, two REs allocated to the length-2 OCC of the first DMRS pattern are non-contiguous in frequency domain. For example, the two REs allocated to the length-2 OCC of the first DMRS pattern are apart from two REs in frequency domain. Relative to one of the four CDM groups of the first DMRS pattern, other three CDM groups are shifted in frequency domain by one RE, four REs, and five REs, respectively.

According to embodiments of the disclosure, the length-2 OCC of the second DMRS pattern is repetitive at an interval of twelve REs in frequency domain. In an embodiment, two REs allocated to the length-2 OCC of the second DMRS pattern are contiguous in frequency domain. Relative to one of the six CDM groups of the second DMRS pattern, other five CDM groups are shifted in frequency domain by two REs, four REs, six REs, eight REs, and ten REs, respectively.

According to embodiments of the disclosure, the length-4 OCC of the third DMRS pattern is repetitive at an interval of twelve REs in frequency domain. In an embodiment, four REs allocated to the length-4 OCC of the third DMRS pattern are contiguous in frequency domain. Relative to one of the three CDM groups of the third DMRS pattern, other two CDM groups are shifted in frequency domain by four REs and eight REs, respectively. In an embodiment, every two adjacent REs of four REs allocated to the length-4 OCC of the third DMRS pattern are apart from three REs in frequency domain. Relative to one of the three CDM groups of the third DMRS pattern, other two CDM groups are shifted in frequency domain by one RE and two REs, respectively. In an embodiment, two first REs that are contiguous in frequency domain and two second REs that are contiguous in frequency domain are allocated to the length-4 OCC of the third DMRS pattern. The two first REs and the two second REs are apart from six REs in frequency domain. Relative to one of the three CDM groups of the third DMRS pattern, other two CDM groups are shifted in frequency domain by two REs and four REs, respectively.

According to embodiments of the disclosure, the length-6 OCC of the fourth DMRS pattern is repetitive at an interval of twelve REs in frequency domain. In an embodiment, every two adjacent REs of six REs allocated to the length-6 OCC of the fourth DMRS pattern are apart from two REs in frequency domain. Relative to one of the two CDM groups of the fourth DMRS pattern, the other CDM group is shifted in frequency domain by one RE.

Aspects of the disclosure provide an apparatus for wireless communication. Processing circuitry of the apparatus determines one or more antenna ports of the apparatus for data transmission. The processing circuitry generates, for each of the one or more antenna ports, a respective demodulation reference signal (DMRS) based on one of a first DMRS pattern, a second DMRS pattern, a third DMRS pattern, and a fourth DMRS pattern. The one or more antenna ports transmit the one or more DMRSs. The first DMRS pattern includes four code division multiplexing (CDM) groups each comprising a length-2 orthogonal cover code (OCC), the second DMRS pattern includes six CDM groups each comprising a length-2 OCC, the third DMRS pattern includes three CDM groups each comprising a length-4 OCC, and the fourth DMRS pattern includes two CDM groups each comprising a length-6 OCC.

Aspects of the disclosure provide a non-transitory computer-readable medium storing instructions which when executed by an apparatus cause the apparatus to perform any one or a combination of the above methods.

BRIEF DESCRIPTION OF THE DRAWINGS

Various embodiments of this disclosure that are proposed as examples will be described in detail with reference to the following figures, wherein like numerals reference like elements, and wherein:

FIGS. 2A-2E show legacy Type 1 and Type 2 demodulation reference signal (DMRS) patterns;

FIGS. 3A-3C show extended Type 1 DMRS patterns according to embodiments of the disclosure;

FIGS. 4A-4C show extended Type 2 DMRS patterns according to embodiments of the disclosure;

FIGS. 6A-6C show frequency-based length-4 OCC DMRS patterns according to embodiments of the disclosure;

FIGS. 7A-7C show frequency-based length-4 OCC DMRS patterns according to embodiments of the disclosure;

FIGS. 8A-8C show frequency-based length-4 OCC DMRS patterns according to embodiments of the disclosure;

FIGS. 9A-9C show frequency-based length-6 OCC DMRS patterns according to embodiments of the disclosure;

FIGS. 11A-11B show time-based length-increased OCC Type 1-based DMRS patterns according to embodiments of the disclosure;

FIGS. 12A-12B show time-based length-increased OCC Type 2-based DMRS patterns according to embodiments of the disclosure;

DETAILED DESCRIPTION OF EMBODIMENTS

The detailed description set forth below in connection with the appended drawings is intended as a description of various configurations and is not intended to represent the only configurations in which the concepts described herein may be practiced. The detailed description includes specific details for the purpose of providing an understanding of various concepts. However, these concepts may be practiced without these specific details.

Several aspects of telecommunication systems will now be presented with reference to various apparatuses and methods. These apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

In wireless communications, a transmitter modulates a sequence of information bits and constructs complex-valued symbols to be transmitted to a receiver through a wireless channel. The wireless channel can change the transmitted symbols before the receiver receives the transmitted symbols according to channel coefficients. However, the channel coefficients themselves can change over time, making it more challenging for the receiver to demodulate the received symbols.

To estimate the channel coefficients, reference signals can be used between the transmitter and the receiver. The reference signals are predefined signals that are known to both the transmitter and the receiver. Demodulation reference signal (DMRS) is one type of the reference signals that can help the receiver demodulate the received symbols by enabling high-quality channel estimation. DMRS can be interleaved with and identically pre-coded as data.

Figure 1:
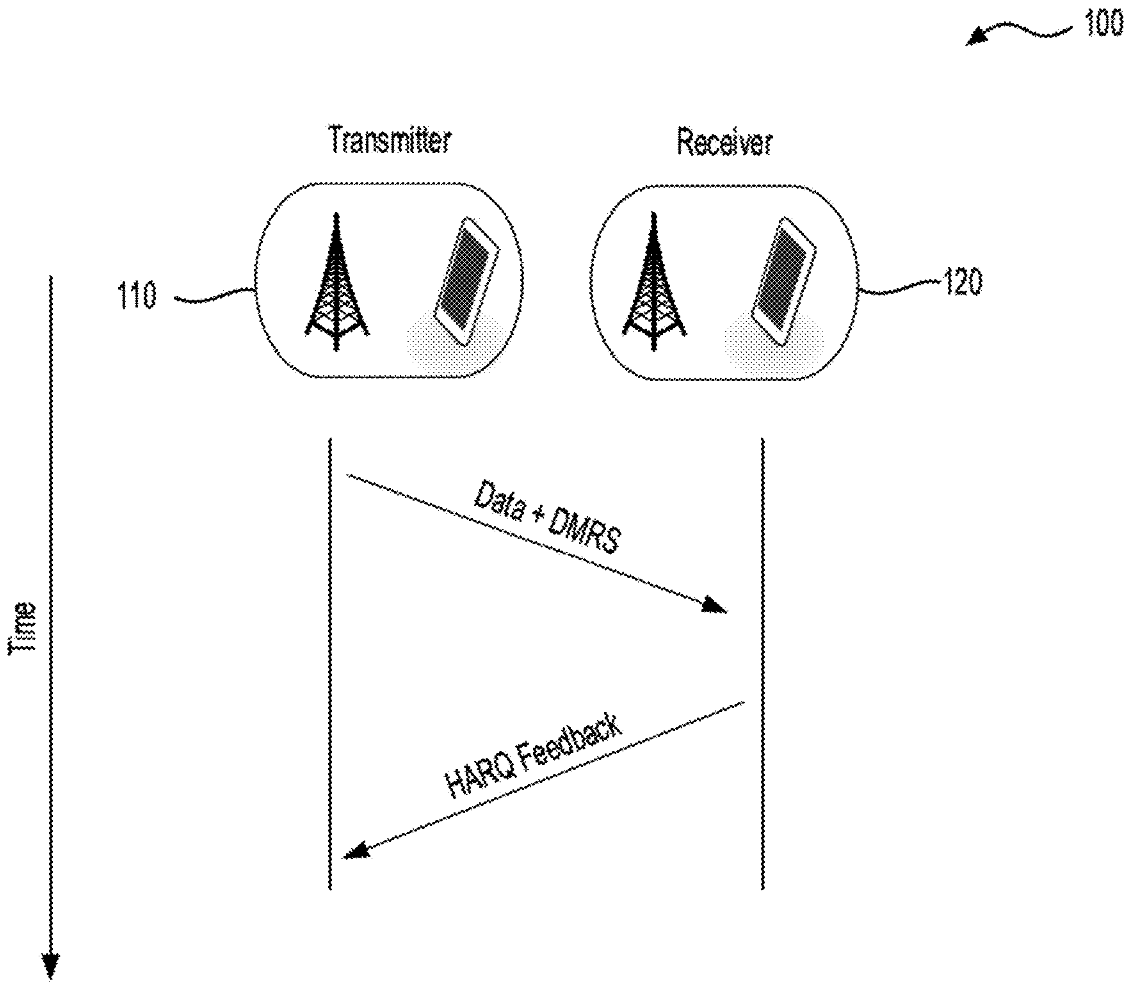
FIG. 1 shows an exemplary procedure of channel estimation according to embodiments of the disclosure.

FIG. 1 shows an exemplary procedure of channel estimation according to embodiments of the disclosure. In FIG. 1, a transmitter 110 can interleave data symbols with DMRS symbols and transmit both the data symbols and DMRS symbols to a receiver 120. When the data symbols and DMRS symbols arrive at the receiver 120, the receiver 120 can estimate a propagation channel based on the DMRS symbols which are already known to the receiver 120. Then, the receiver 120 can equalize the received data symbols to eliminate the effect of the propagation channel before demodulating the received data symbols.

After the data demodulation, the receiver 120 can attempt to decode the data, and then send feedback to the transmitter 110 about the decoding process, for example, in a form of a hybrid automatic repeat request (HARQ) message.

It can be seen that DMRS is very crucial in the channel estimation. In absence of DMRS, the demodulation performance of the receiver 120 can be significantly reduced. However, resource elements (REs) should be assigned to DMRS, and thus an overhead level of DMRS should be considered for a DMRS design. A higher overhead level can achieve a higher channel estimation quality. Accordingly, a balance between the DMRS overhead and the channel estimation quality is important for a good DMRS design.

In 5G NR, two types of DMRS are defined and referred to as Type 1 and Type 2. These two types have different patterns of assigned REs. The different patterns can result in different overhead levels and different performances of DMRS-based channel estimation.

In TS 28.211 section 7.4.1.1.1, for physical downlink shared channel (PDSCH), a DMRS sequence can be defined as $$r(n) = \frac{1}{\sqrt{2}}(1 - 2\cdot c(2n)) + j\frac{1}{\sqrt{2}}(1 - 2\cdot c(2n+1)).$$

The sequence r(n) can be scaled by a factor of $$\beta_{PDSCH}^{DMRS}$$

to conform with the transmission power specified in TS 38.214 and mapped to resource elements $(k,l)_{p,u}$ according to Eq. 1-Eq. 5.

$$a_{k,l}^{(p,u)} = \beta_{PDSCH}^{DMRS} w_f(k')w_t(l')r(2n+k') \quad \text{(Eq. 1)}$$

$$k = \begin{cases} 4n+2k'+\Delta & \text{Configuration Type 1} \\ 6n+k'+\Delta & \text{Configuration Type 2} \end{cases} \quad \text{(Eq. 2)}$$

$$k' = 0, 1 \quad \text{(Eq. 3)}$$

$$l = \bar{l} + l' \quad \text{(Eq. 4)}$$

$$n = 0,1, \ldots \quad \text{(Eq. 5)}$$

where k and l represent frequency domain location and time domain location, respectively. $w_f$(k'), $w_t$(l'), and Δ are given by Tables 7.4.1.1.2-1 and 7.4.1.1.2-2 in TS 38.211, which are shown in FIGS. 2A and 2B, respectively. $\bar{l}$ represents the time domain location of the first OFDM symbol for single-symbol or double-symbol DMRS and is given by Tables 7.4.1.1.2-3 and 7.4.1.1.2-4 in TS 38.211, which are not shown in this disclosure. In addition, as shown in FIG. 2C (Table 7.4.1.1.2-5 in TS 38.211), l'=0 for single-symbol DMRS, l'=0, 1 for double-symbol DMRS. Accordingly, single-symbol Type 1 DMRS can support up to 4 antenna ports (port 1000-1003), single-symbol Type 2 DMRS can support up to 6 antenna ports (port 1000-1005), double-symbol Type 1 DMRS can support up to 8 antenna ports (port 1000-1007), and double-symbol Type 2 DMRS can support up to 12 antenna ports (port 1000-1011).

It is noted that in all RE mapping pattern figures (e.g., FIGS. 2D-2E) in this disclosure, sc idx and sym idx represent sub-carrier index and orthogonal frequency-division multiplexing (OFDM) symbol index, respectively.

FIG. 2D shows mapped REs of Type 1 single-symbol and double-symbol DMRS patterns. For Type 1 DMRS pattern, DMRS symbols are assigned at REs with frequency location $k=4n+2k'+\Delta$ and time location $l=\bar{l}+l'$, where $l'=0$ for single-symbol DMRS and $l'=0, 1$ for double-symbol DMRS.

Resource mapping for Type 1 DMRS can be based on Eq. 1-Eq. 5 and FIGS. 2A and 2C. Taking Type 1 single-symbol DMRS pattern as an example, for each port, 3 pairs (6 REs) of DMRS symbols are dispersed in one OFDM symbol of one resource block (RB). For example, for port 1003 in Type 1 single-symbol DMRS pattern, 3 pairs of DMRS symbols 201-203 are dispersed at one OFDM symbol of one RB. Every two adjacent pairs are apart from 4 REs (4n) in frequency domain. For example, the first RE (1, 0) in the first pair 201 and the first RE (5, 0) in the second pair 202 are apart from 4 REs in frequency domain. The two REs in each pair are apart at an interval of 2 REs (2k') in frequency domain. For example, the first RE (1, 0) and the second RE (3, 0) in the first pair 201 are apart from 2 REs in frequency domain.

FIG. 2E shows mapped REs of Type 2 single-symbol and double-symbol DMRS patterns. For Type 2 DMRS pattern, DMRS symbols are assigned at REs with frequency location $k=6n+k'+\Delta$ and time location $l=\bar{l}+l'$, where $l'=0$ for single-symbol DMRS and $l'=0, 1$ for double-symbol DMRS.

Resource mapping for Type 2 DMRS can be based on Eq. 1-Eq. 5 and FIGS. 2B and 2C. Taking Type 2 single-symbol DMRS pattern as an example, for each port, 2 pairs (4 REs) of DMRS symbols are dispersed in one OFDM symbol of one RB. For example, for port 1000 in Type 2 single-symbol DMRS pattern, 2 pairs of DMRS symbols 211-212 are dispersed at one OFDM symbol of one RB. The two pairs are apart from 6 REs (6n) in frequency domain. For example, the first RE (0, 0) in the first pair 211 and the first RE (6, 0) in the second pair 212 are apart from 6 REs in frequency domain. The two REs in each pair are apart at an interval of 1 REs (k') in frequency domain, meaning that the two REs are contiguous in frequency domain. For example, the first RE (0, 0) and the second RE (1, 0) in the first pair 211 are apart from 1 RE (or contiguous) in frequency domain.

Compared to Type 1 (or Type 2) single-symbol DMRS pattern, Type 1 (or Type 2) double-symbol DMRS pattern can occupy two adjacent symbols. The first symbol for a port in Type 1 (or Type 2) double-symbol DMRS pattern can be the same as the corresponding symbol for the port in Type 1 (or Type 2) single-symbol DMRS pattern, and the second symbol ($l'=1$) for the port in Type 1 (or Type 2) double-symbol DMRS pattern can be either a repetition or a reversion of the first symbol ($l'=0$) for the port in Type 1 (or Type 2) double-symbol DMRS pattern. For example, in Type 1 double-symbol DMRS pattern, the second symbol of each of ports 1000-1003 is a repetition of the first symbol of the respective port, and the second symbol of each of ports 1004-1007 is a reversion of the first symbol of the respective port. Accordingly, Type 1 (or Type 2) double-symbol DMRS pattern can support a twice number of ports that Type 1 (or Type 2) single-symbol DMRS pattern can support.

It is noted that DMRSs of different ports are orthogonal, and the orthogonality of these DMRSs can be achieved in the time domain, frequency domain, or code domain. For example, in FIG. 2D, for Type 1 single-symbol DMRS pattern, port 1000 and port 1001 are orthogonal in code domain, and port 1000 and port 1002 are orthogonal in frequency domain.

DMRS can be generated for each data port, and a number of realizable DMRS ports can limit a number of layers that can be spatially multiplexed. This is especially crucial for multi-user, multiple input, and multiple output (MU-MIMO) settings where a number of user equipments (UEs) that can be simultaneously served can be limited by the number of DMRS ports available to a network.

As described above, legacy Type 1 and Type 2 DMRS patterns allow simultaneous DMRS transmission from up to 8 and 12 ports, respectively. Allowing only 12 simultaneous ports to carry DMRS at any given time restricts an ability to exploit spatial multiplexing opportunities, which can allow for more than 12 data streams to be used. Accordingly, this disclosure provides various DMRS patterns to increase the maximum number of orthogonal DMRS ports.

According to embodiments of the disclosure, Type 1 and Type 2 DMRS patterns can be extended by making the RE assignment sparser in frequency domain. For example, the frequency location k can be defined as $$k = \begin{cases} 8n + 2k' + \Delta & \text{To extend Type 1 } DMRS \\ 12n + k' + \Delta & \text{To extend Type 2 } DMRS \end{cases} \quad \text{(Eq. 6)}$$

where $k'=0, 1$.

FIG. 3A shows a mapping table of an exemplary extended Type 1 DMRS pattern. Based on Eq. 3-Eq. 6, for extended Type 1 DMRS pattern, DMRS symbols can be assigned at REs with frequency location $k=8n+2k'+\Delta$ and time location $l=\bar{l}+l'$, where $l'=0$ for single-symbol DMRS, $l'=0, 1$ for double-symbol DMRS.

Figure 3B:
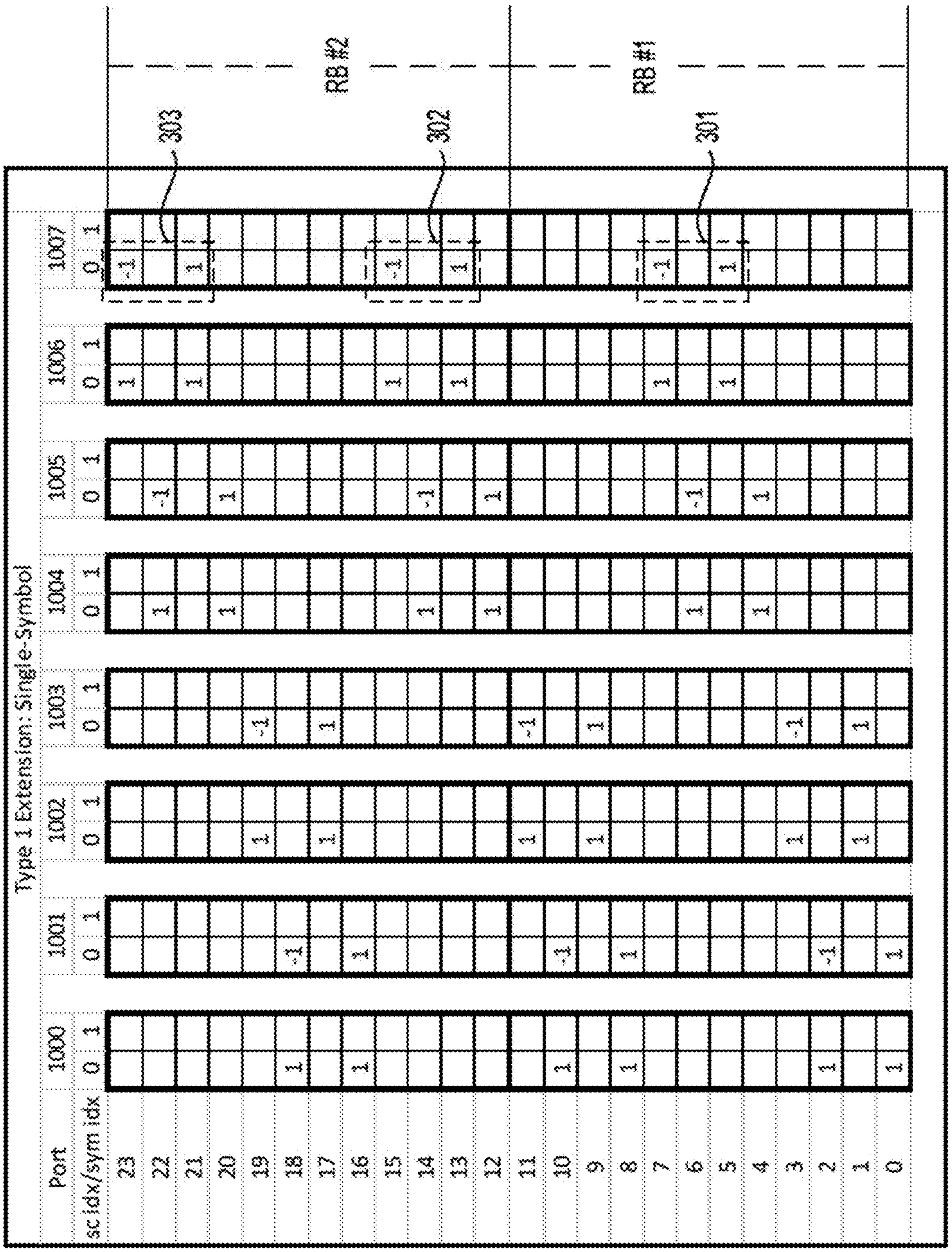

FIG. 3B shows mapped REs of extended Type 1 single-symbol DMRS pattern. As shown in FIG. 3B, for each port, 3 pairs (6 REs) of DMRS symbols are dispersed in one combined OFDM symbol that is combined by two OFDM symbols from two RBs. For example, for port 1007, 3 pairs of DMRS symbols 301-303 are dispersed at one combined symbol that is combined by two symbols from two RBs (RB #1 and RB #2). Every two adjacent pairs are apart from 8 REs (8n) in frequency domain. For example, the first RE (5, 0) in the first pair 301 and the first RE (13, 0) in the second pair 302 are apart from 8 REs in frequency domain. The two REs in each pair are apart at an interval of 2 REs (2k') in frequency domain. For example, the first RE (5, 0) and the second RE (7, 0) in the first pair 301 are apart from 2 REs in frequency domain.

It can be seen that extended Type 1 single-symbol DMRS pattern can support up to 8 ports, compared to Type 1 single-symbol DMRS pattern which can only support up to 4 ports, as shown in FIG. 2D.

FIG. 3C shows mapped REs of extended Type 1 double-symbol DMRS pattern. Similar to the relationship between legacy Type 1 single-symbol and double-symbol DMRS patterns, for each port, the first symbol ($l'=0$) in extended Type 1 double-symbol DMRS pattern can be the same as the corresponding symbol ($l'=0$) in extended Type 1 single-symbol DMRS pattern, and the second symbol ($l'=1$) in extended Type 1 double-symbol DMRS pattern can be either a repetition or a reversion of the first symbol (l'=0) in extended Type 1 double-symbol DMRS pattern. For example, in extended Type 1 double-symbol DMRS pattern, the second symbol of each of ports 1000-1007 is a repetition of the first symbol of the respective port, and the second symbol of each of ports 1008-1015 is a reversion of the first symbol of the respective port. Accordingly, extended Type 1 double-symbol DMRS pattern can support up to 16 ports, compared to Type 1 double-symbol DMRS pattern which can only support up to 8 ports, as shown in FIG. 2D.

FIG. 4A shows a mapping table of an exemplary extended Type 2 DMRS pattern. Based on Eq. 3-Eq. 6, for the extended Type 2 DMRS pattern, DMRS symbols can be assigned at REs with frequency location $k=12n+k'+\Delta$ and time location $l=\bar{l}+l'$, where $l'=0$ for single-symbol DMRS, $l'=0, 1$ for double-symbol DMRS.

FIG. 4B shows mapped REs of extended Type 2 single-symbol DMRS pattern. As shown in FIG. 4B, for each port, 1 pair (2 REs) of DMRS symbols are dispersed in one OFDM symbol of one RB. Accordingly, two adjacent pairs are located in two adjacent RBs and apart from 12 REs (12n) in frequency domain. The two REs in each pair are apart at an interval of 1 RE (k') in frequency domain, meaning that the two REs are contiguous in frequency domain.

It can be seen that extended Type 2 single-symbol DMRS pattern can support up to 12 ports, compared to Type 2 single-symbol DMRS pattern which can only support up to 6 ports, as shown in FIG. 2E.

FIG. 4C shows mapped REs of extended Type 2 double-symbol DMRS pattern. Similar to the relationship between legacy Type 2 single-symbol and double-symbol DMRS patterns, for each port, the first symbol (l'=0) in extended Type 2 double-symbol DMRS pattern can be the same as the corresponding symbol (l'=0) in extended Type 1 single-symbol DMRS pattern, and the second symbol (l'=1) in extended Type 2 double-symbol DMRS pattern can be either a repetition or a reversion of the first symbol (l'=0) in extended Type 2 double-symbol DMRS pattern. For example, in extended Type 2 double-symbol DMRS pattern, the second symbol of each of ports 1000-1011 is a repetition of the first symbol of the respective port, and the second symbol of each of ports 1012-1023 is a reversion of the first symbol of the respective port. Accordingly, extended Type 2 double-symbol DMRS pattern can support up to 24 ports, compared to Type 2 double-symbol DMRS pattern which can only support up to 12 ports, as shown in FIG. 2E.

It is noted that, as shown in FIGS. 3A-4C, port orthogonality between legacy types (Type 1 and Type 2) and extended types (extended Type 1 and extended Type 2) can still be maintained.

According to embodiments of the disclosure, compared to legacy types, larger code division multiplexing (CDM) groups can be used in DMRS patterns so that more ports can be multiplexed in code domain. For example, as shown in FIG. 2A or FIG. 2B, each CDM group in legacy Type 1 or Type 2 has a length of 2 so that a length of each pair of DMRS symbols is 2 ($k'\in\{0, 1\}$) in frequency domain. One pair of DMRS symbols can be referred to as an orthogonal cover code (OCC). Accordingly, to increase the maximum number of orthogonal DMRS ports, a length of each pair of DMRS symbols (or OCC) can be increased in frequency domain by increasing k' and/or in time domain by increasing l'. That is, a longer OCC can enable more DMRS ports to share the same REs while maintaining orthogonality in the code domain.

Figure 5:
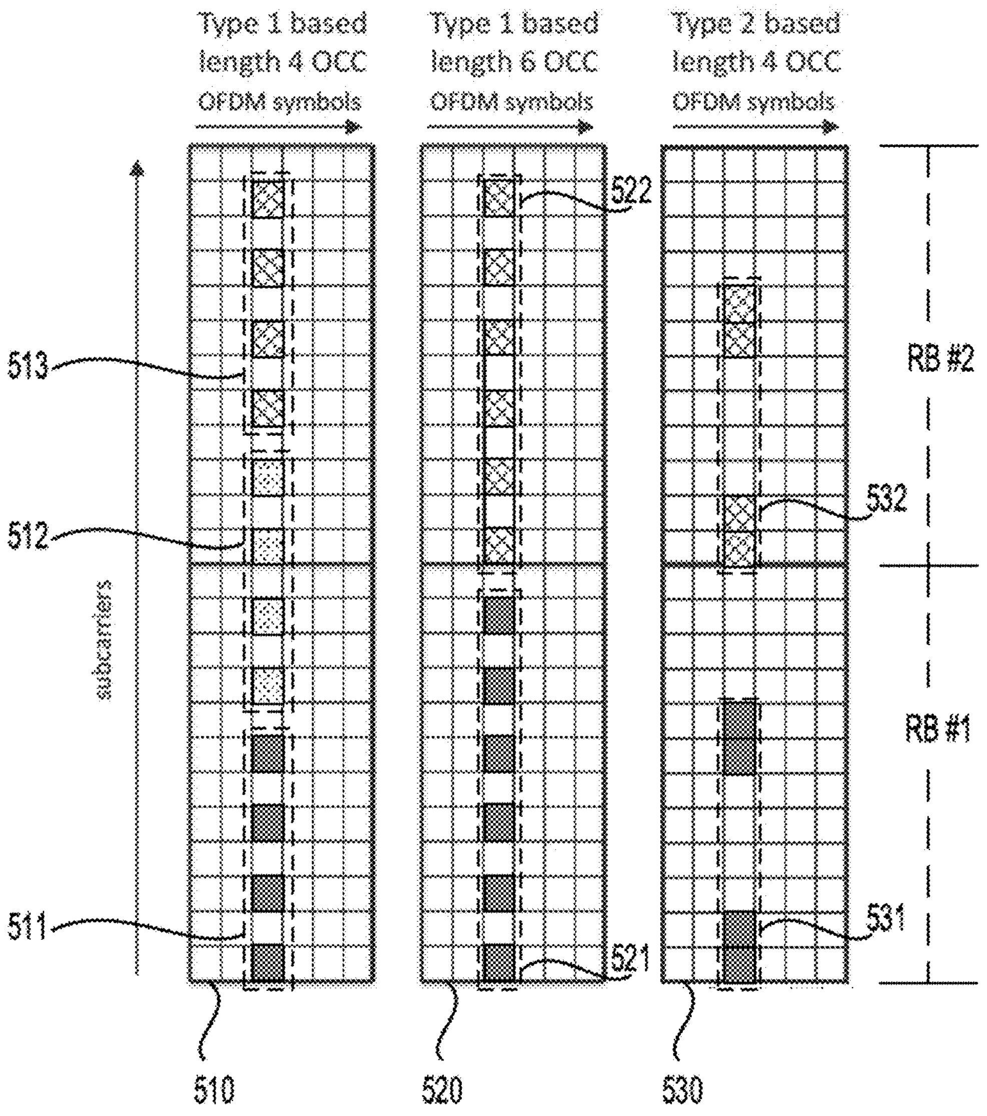
FIG. 5 shows frequency-based length-increased orthogonal cover code (OCC) DMRS patterns according to embodiments of the disclosure.

FIG. 5 shows exemplary mapped REs of OCC with increased lengths in frequency domain. Specifically, a first DMRS pattern 510 is based on doubling a length of OCC in legacy Type 1 DMRS pattern so that each OCC in the first DMRS pattern 501 has a length of 4 and every two adjacent OCCs are apart from 8 REs. As shown in FIG. 5, in the first DMRS pattern 510, 3 pairs (12 REs) of DMRS symbols 511-513 are dispersed in a combined OFDM symbol that is combined by two OFDM symbols from two RBs (RB #1 and RB #2), and the pair 512 is dispersed across the two RBs. Thus, odd RB and even RB have different DMRS patterns.

Instead, Type 1 based length-6 OCC with complex-values cover code can solve this issue and make the DMRS pattern identical for all RBs. A second DMRS pattern 520 is based on tripling the length of an OCC in legacy Type 1DMRS pattern so that each OCC in the second DMRS pattern 502 has a length of 6 and every two adjacent OCCs are apart from 12 REs. In the second DMRS pattern 520, each OCC can have complex values.

Type 2 based length-4 OCC still results in uniform pattern across all RBs. A third DMRS pattern 530 is based on doubling a length of an OCC in legacy Type 2 DMRS pattern so that each OCC in the third DMRS pattern 530 has a length of 4 and every two adjacent OCCs are apart from 12 REs.

In an embodiment, a DMRS pattern with a length-4 OCC in frequency domain can be generated based on $k=12n+k'+\Delta$, where $k'\in\{0, 1, 2, 3\}$. The length in time domain can be the same as legacy DMRS patterns. That is, $l=\bar{l}+l'$, where $l'=0$ for single-symbol DMRS, $l'=0, 1$ for double-symbol DMRS. FIGS. 6A-6C show a mapping table and mapped REs of single-symbol and double-symbol DMRS patterns based on the length-4 OCC in frequency domain. It can be seen that the single-symbol and double-symbol DMRS patterns based on the length-4 OCC in frequency domain can support up to 12 and 24 orthogonal ports, respectively.

In an embodiment, a DMRS pattern with a length-4 OCC in frequency domain can be generated based on $k=12n+3k'+\Delta$, where $k'\in\{0, 1, 2, 3\}$. The length in time domain can be the same as legacy DMRS patterns. That is, $l=\bar{l}+l'$, where $l'=0$ for single-symbol DMRS, $l'=0, 1$ for double-symbol DMRS. FIGS. 7A-7C show a mapping table and mapped REs of single-symbol and double-symbol DMRS patterns based on the length-4 OCC in frequency domain. It can be seen that the single-symbol and double-symbol DMRS patterns based on the length-4 OCC in frequency domain can support up to 12 and 24 orthogonal ports, respectively.

In an embodiment, a DMRS pattern with a length-4 OCC in frequency domain can be generated based on $k=12n+k'+\Delta$, where $k'\in\{0, 1, 6, 7\}$. The length in time domain can be the same as legacy DMRS patterns. That is, $l=\bar{l}+l'$, where $l'=0$ for single-symbol DMRS, $l'=0, 1$ for double-symbol DMRS. FIGS. 8A-8C show a mapping table and mapped REs of single-symbol and double-symbol DMRS patterns based on the length-4 OCC in frequency domain. It can be seen that the single-symbol and double-symbol DMRS patterns based on the length-4 OCC in frequency domain can support up to 12 and 24 orthogonal ports, respectively.

In an embodiment, a DMRS pattern with a length-6 OCC in frequency domain can be generated based on $k=12n+2k'+\Delta$, where $k'\in\{0, 1, 2, 3, 4, 5\}$. The length in time domain can be the same as legacy DMRS patterns. That is, $l=\bar{l}+l'$, where $l'=0$ for single-symbol DMRS, $l'=0, 1$ for double-symbol DMRS. FIGS. 9A-9C show a mapping table and mapped REs of single-symbol and double-symbol DMRS patterns based on the length-6 OCC in frequency domain. Since 6 REs are used per RB in Type 1 DMRS, a complex-valued orthogonal cover code can be used instead of the legacy OCC from {1, −1}. An example is to use columns from discrete Fourier transform (DFT) matrices, as shown in FIG. 9A, where $$\omega = e^{\frac{-2\pi j}{N}},\ N = 6.$$

It can be seen that the single-symbol and double-symbol DMRS patterns based on the length-6 OCC in frequency domain can support up to 8 and 16 orthogonal ports, respectively.

A length of OCC can also be increased in time domain to maximize the number of orthogonal ports. To allow a longer OCC in time domain, additional DMRS symbols can be configured. For example, to double the number of DMRS ports, the time-domain OCC length should at least be doubled. This can be achieved by configuring double-symbol DMRS with one additional double-symbol or single-symbol DMRS with three additional DMRS symbols.

Figure 10:
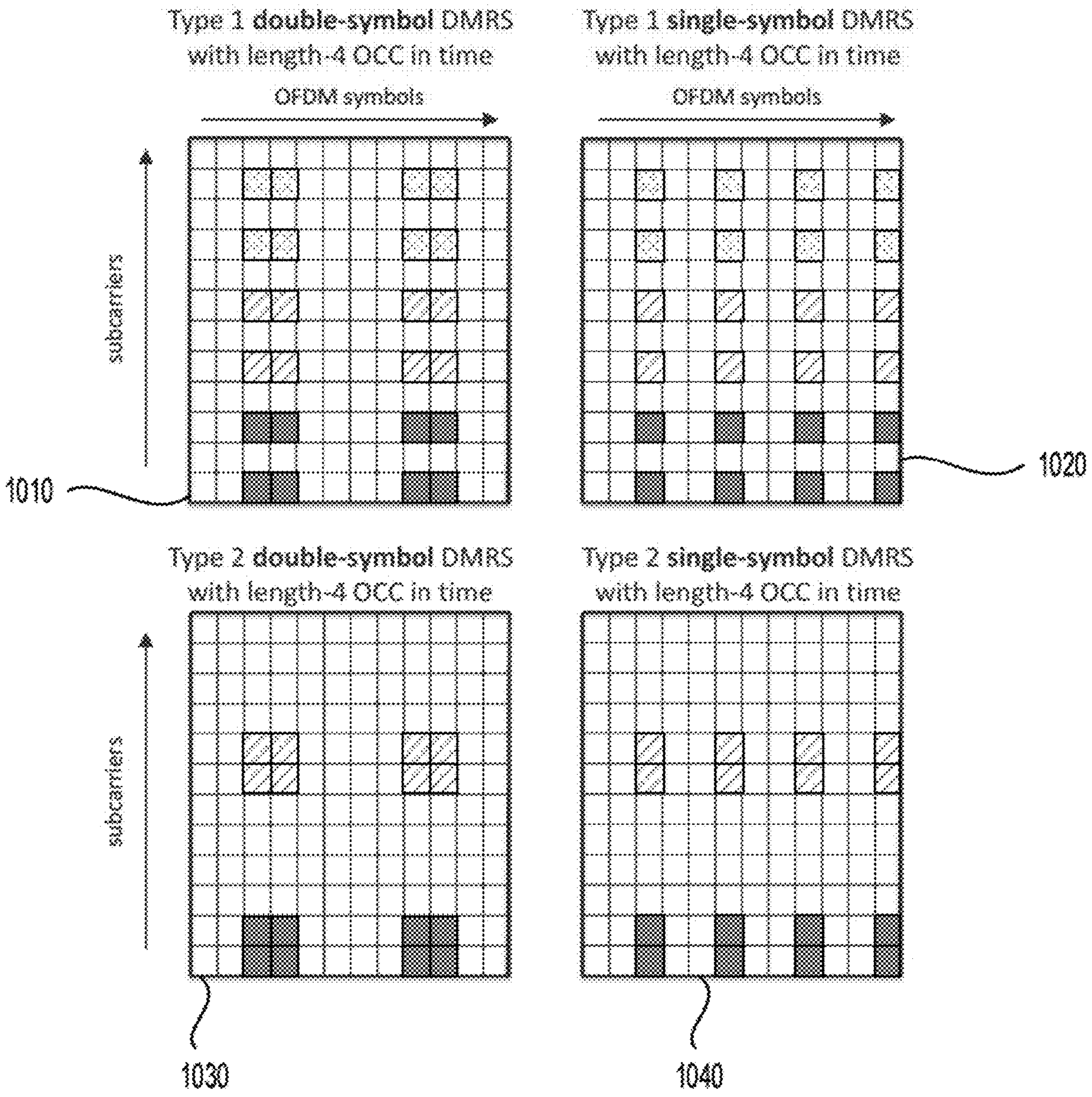
FIG. 10 shows time-based length-increased OCC DMRS patterns according to embodiments of the disclosure.

FIG. 10 shows exemplary mapped REs of OCC with increased lengths in time domain. In FIG. 10, the DMRS patterns 1010-1040 are based on Type 1 double-symbol, Type 1 single-symbol, Type 2 double-symbol, and Type 2 single-symbol, respectively. The DMRS patterns 1010 and 1030 are based on doubling the length of OCC in Type 1 double-symbol and Type 2 double-symbol in time domain, respectively. The DMRS patterns 1020 and 1040 are based on quadrupling the length of OCC in Type 1 single-symbol and Type 2 single-symbol in time domain, respectively. Accordingly, a length of OCC in each pattern is 4 in time domain.

According to embodiments of the disclosure, legacy Type 1 and Type 2 DMRS patterns can be modified by making the RE assignment longer in time domain. The RE mapping can still be based on Eq. 1-Eq. 3, while Eq. 4 is replaced with the following equation:

$$l = \begin{cases} \bar{l}_{l'} & \text{single-symbol } DMRS \\ \bar{l}_{\lfloor \frac{l'}{2} \rfloor} + \text{mod}(l', 2) & \text{double-symbol } DMRS \end{cases} \quad \text{(Eq. 7)}$$

where l'∈{0, 1, 2, 3} for both single-symbol DMRS and for double-symbol DMRS, as well. Note here that the time-based length-increased OCC code can extend in time domain over 4 single-symbol DMRS symbols (k, $\bar{l}_0$), (k, $\bar{l}_1$), (k, $\bar{l}_2$), and (k, $\bar{l}_3$), or over 2 pairs of double-symbol DMRS symbols (one pair is (k, $\bar{l}_0$), (k, $\bar{l}_0$+1) and the other pair is (k, $\bar{l}_1$), (k, $\bar{l}_1$+1)).

It is noted that the 4 single-symbol DMRS symbols may be or may not be contiguous in time domain. That is, there may or may not be a gap between any two of $\bar{l}_0$, $\bar{l}_1$, $\bar{l}_2$, and $\bar{l}_3$. In addition, the two REs in each pair of double-symbol DMRS symbols are contiguous in time domain, and the two pairs of double-symbol DMRS symbols may or may not be contiguous in time domain. That is, there may or may not be a gap between $\bar{l}_0$+1 and $\bar{l}_1$.

FIG. 11A shows a mapping table of the time-based length-increased OCC design based on Type 1 DMRS pattern. Based on Eq. 2 and Eq. 7, DMRS symbols can be assigned at REs with frequency location k=4n+2k'+Δ and time location l∈{$\bar{l}_0$, $\bar{l}_1$, $\bar{l}_2$, $\bar{l}_3$} for single-symbol DMRS, or l∈{$\bar{l}_0$, $\bar{l}_0$+1, $\bar{l}_1$, $\bar{l}_1$+1} for double-symbol DMRS.

FIG. 11B shows mapped REs of the time-based length-increased OCC design based on Type 1 DMRS pattern. The mapped REs can be either used for single-symbol or double-symbol DMRS. It is noted that, although the four DMRS symbols for each port are contiguous in time domain in the example of FIG. 11B, the four DMRS symbols may not be contiguous in another example. For example, in a single-symbol DMRS design, the four DMRS symbols can be allocated as the design pattern 1020 in FIG. 10, while in a double-symbol DMRS design, the four DMRS symbols can be allocated as the design pattern 1010 in FIG. 10. It can be seen that the time-based length-increased OCC DMRS pattern can support up to 16 ports.

FIG. 12A shows a mapping table of the time-based length-increased OCC design based on Type 2 DMRS pattern. Based on Eq. 2 and Eq. 7, DMRS symbols can be assigned at REs with frequency location k=6n+k'+Δ and time location l∈{$\bar{l}_0$, $\bar{l}_1$, $\bar{l}_2$, $\bar{l}_3$} for single-symbol DMRS, or l∈{$\bar{l}_0$, $\bar{l}_0$+1, $\bar{l}_1$, $\bar{l}_1$+1} for double-symbol DMRS.

FIG. 12B shows mapped REs of the time-based length-increased OCC design based on Type 2 DMRS pattern. The mapped REs can be either used for single-symbol or double-symbol DMRS. It is noted that, although the four DMRS symbols for each port are contiguous in time domain in the example of FIG. 12B, the four DMRS symbols may not be contiguous in another example. For example, in a single-symbol DMRS design, the four DMRS symbols can be allocated as the design pattern 1040 in FIG. 10, while in a double-symbol DMRS design, the four DMRS symbols can be allocated as the design pattern 1030 in FIG. 10. It can be seen that the time-based length-increased OCC DMRS pattern can support up to 16 ports.

This disclosure presents various DMRS patterns that can increase a system capacity compared to the legacy DMRS patterns by increasing a number of orthogonal DMRS ports. More orthogonal DMRS ports can enable the transmission of a larger number of data streams, and hence, can better exploit the spatial multiplexing opportunities in the wireless channel environment. All presented DMRS patterns can coexist with the legacy DMRS designs. The maximum overhead levels of the presented DMRS patterns are unchanged compared to the legacy DMRS designs. Different DMRS patterns can be suited for different wireless channel conditions, such as high or low delay spread or doppler spread.

Figure 13:
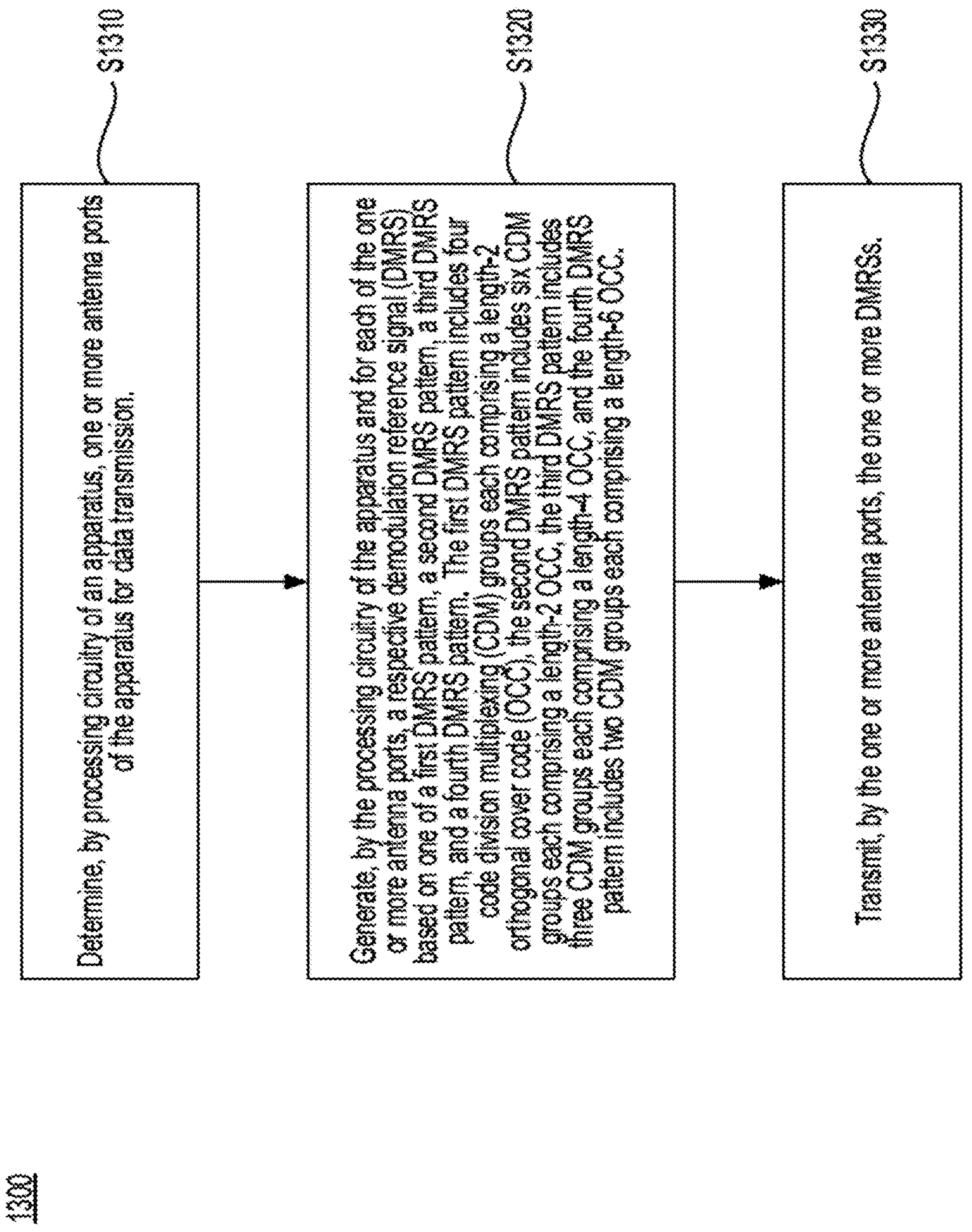
FIG. 13 shows a flowchart outlining a process according to embodiments of the disclosure.

FIG. 13 shows a flowchart outlining a process 1300 according to embodiments of the disclosure. The process 1300 can be executed by apparatus 1400 in FIG. 14. The process 1300 may start at step S1310.

At step S1310, the process 1300 determines, by processing circuitry 1410 of the apparatus 1400, one or more antenna ports (e.g., in antenna panels 1440 and/or 1450) of the apparatus 1400 for data transmission. Then, the process proceeds to step S1320.

At step S1320, the process 1300 generates, by the processing circuitry 1410 of the apparatus 1400 and for each of the one or more antenna ports, a respective DMRS based on one of a first DMRS pattern, a second DMRS pattern, a third DMRS pattern, and a fourth DMRS pattern. The first DMRS pattern includes four CDM groups each comprising a length-2 OCC (e.g., as shown in FIG. 3A), the second DMRS pattern includes six CDM groups each comprising a length-2 OCC (e.g., as shown in FIG. 4A), the third DMRS pattern includes three CDM groups each comprising a length-4 OCC (e.g., as shown in FIGS. 6A, 7A, and 8A), and the fourth DMRS pattern includes two CDM groups each comprising a length-6 OCC (e.g., as shown in FIG. 9A). Then, the process proceeds to step S1330.

At step S1330, the process 1300 transmits, by the one or more antenna ports, the one or more DMRSs. Then, the process 1300 terminates.

According to embodiments of the disclosure, the length-2 OCC of the first DMRS pattern is repetitive at an interval of eight resource elements (REs) in frequency domain (e.g., as shown in FIG. 3B). In an embodiment, two REs allocated to the length-2 OCC of the first DMRS pattern are non-contiguous in frequency domain. For example, the two REs allocated to the length-2 OCC of the first DMRS pattern are apart from two REs in frequency domain. Relative to one of the four CDM groups of the first DMRS pattern, other three CDM groups are shifted in frequency domain by one RE, four REs, and five REs, respectively.

According to embodiments of the disclosure, the length-2 OCC of the second DMRS pattern is repetitive at an interval of twelve REs in frequency domain (e.g., as shown in FIG. 4B). In an embodiment, two REs allocated to the length-2 OCC of the second DMRS pattern are contiguous in frequency domain. Relative to one of the six CDM groups of the second DMRS pattern, other five CDM groups are shifted in frequency domain by two REs, four REs, six REs, eight REs, and ten REs, respectively.

According to embodiments of the disclosure, the length-4 OCC of the third DMRS pattern is repetitive at an interval of twelve REs in frequency domain (e.g., as shown in FIGS. 6B, 7B, and 8B). In an embodiment, four REs allocated to the length-4 OCC of the third DMRS pattern are contiguous in frequency domain (e.g., as shown in FIG. 6B). Relative to one of the three CDM groups of the third DMRS pattern, other two CDM groups are shifted in frequency domain by four REs and eight REs, respectively. In an embodiment, every two adjacent REs of four REs allocated to the length-4 OCC of the third DMRS pattern are apart from three REs in frequency domain (e.g., as shown in FIG. 7B). Relative to one of the three CDM groups of the third DMRS pattern, other two CDM groups are shifted in frequency domain by one RE and two REs, respectively. In an embodiment, two first REs that are contiguous in frequency domain and two second REs that are contiguous in frequency domain are allocated to the length-4 OCC of the third DMRS pattern (e.g., as shown in FIG. 8B). The two first REs and the two second REs are apart from six REs in frequency domain. Relative to one of the three CDM groups of the third DMRS pattern, other two CDM groups are shifted in frequency domain by two REs and four REs, respectively.

According to embodiments of the disclosure, the length-6 OCC of the fourth DMRS pattern is repetitive at an interval of twelve REs in frequency domain (e.g., as shown in FIG. 9B). In an embodiment, every two adjacent REs of six REs allocated to the length-6 OCC of the fourth DMRS pattern are apart from two REs in frequency domain. Relative to one of the two CDM groups of the fourth DMRS pattern, the other CDM group is shifted in frequency domain by one RE.

Figure 14:
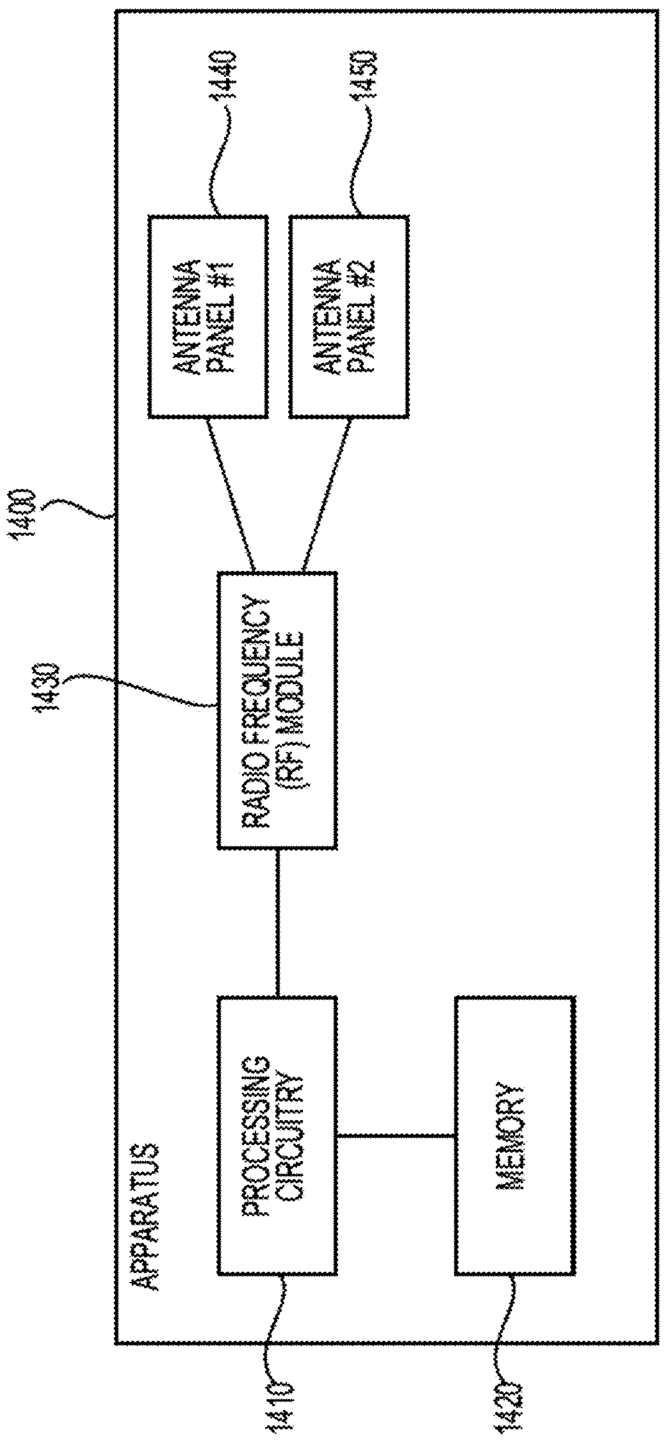
FIG. 14 shows an exemplary apparatus according to embodiments of the disclosure.

FIG. 14 shows an exemplary apparatus 1400 according to embodiments of the disclosure. The apparatus 1400 can be configured to perform various functions in accordance with one or more embodiments or examples described herein. Thus, the apparatus 1400 can provide means for implementation of techniques, processes, functions, components, systems described herein. For example, the apparatus 1400 can be used to implement functions of a UE or a base station (BS) (e.g., gNB) in various embodiments and examples described herein. The apparatus 1400 can include a general-purpose processor or specially designed circuits to implement various functions, components, or processes described herein in various embodiments. The apparatus 1400 can include processing circuitry 1410, a memory 1420, a radio frequency (RF) module 1430, and two antenna panels 1440 and 1450.

In various examples, the processing circuitry 1410 can include circuitry configured to perform the functions and processes described herein in combination with software or without software. In various examples, the processing circuitry 1410 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1410 can be a central processing unit (CPU) configured to execute program instructions to perform various functions and processes described herein. Accordingly, the memory 1420 can be configured to store program instructions. The processing circuitry 1410, when executing the program instructions, can perform the functions and processes. The memory 1420 can further store other programs or data, such as operating systems, application programs, and the like. The memory 1420 can include a read only memory (ROM), a random-access memory (RAM), a flash memory, a solid-state memory, a hard disk drive, an optical disk drive, and the like.

The RF module 1430 receives a processed data signal from the processing circuitry 1410 and converts the data signal to beamforming wireless signals that are then transmitted via the antenna panels 1440 and/or 1450, or vice versa. The RF module 1430 can include a digital to analog convertor (DAC), an analog to digital converter (ADC), a frequency up convertor, a frequency down converter, filters and amplifiers for reception and transmission operations. The RF module 1430 can include multi-antenna circuitry for beamforming operations. For example, the multi-antenna circuitry can include an uplink spatial filter circuit, and a downlink spatial filter circuit for shifting analog signal phases or scaling analog signal amplitudes. Each of the antenna panels 1440 and 1450 can include one or more antenna arrays.

In an embodiment, part of all the antenna panels 1440/1450 and part or all functions of the RF module 1430 are implemented as one or more TRPs (transmission and reception points), and the remaining functions of the apparatus 1400 are implemented as a BS. Accordingly, the TRPs can be co-located with such a BS, or can be deployed away from the BS.

The apparatus 1400 can optionally include other components, such as input and output devices, additional or signal processing circuitry, and the like. Accordingly, the apparatus 1400 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid-state memory, magnetic tape, a removable computer diskette, a random-access memory (RAM), a read-only memory (ROM), a magnetic disk and an optical disk, and the like. The computer-readable non-transitory storage medium can include all types of computer readable medium, including magnetic storage medium, optical storage medium, flash medium, and solid-state storage medium.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication, comprising:

determining, by processing circuitry of an apparatus, one or more antenna ports of the apparatus for data transmission;

generating, by processing circuitry of an apparatus and for each of the one or more antenna ports, a respective demodulation reference signal (DMRS) based on one of a first DMRS pattern, a second DMRS pattern, a third DMRS pattern, and a fourth DMRS pattern; and transmitting, by the one or more antenna ports, the one or more DMRSs, wherein the first DMRS pattern includes four code division multiplexing (CDM) groups each comprising a length-2 orthogonal cover code (OCC), the second DMRS pattern includes six CDM groups each comprising a length-2 OCC, the third DMRS pattern includes three CDM groups each comprising a length-4 OCC, and the fourth DMRS pattern includes two CDM groups each comprising a length-6 OCC.

2. The method of claim 1, wherein the length-2 OCC of the first DMRS pattern is repetitive at an interval of eight resource elements (REs) in frequency domain.

3. The method of claim 2, wherein two REs allocated to the length-2 OCC of the first DMRS pattern are non-contiguous in frequency domain.

4. The method of claim 3, wherein the two REs allocated to the length-2 OCC of the first DMRS pattern are apart from two REs in frequency domain.

5. The method of claim 2, wherein relative to one of the four CDM groups of the first DMRS pattern, other three CDM groups are shifted in frequency domain by one RE, four REs, and five REs, respectively.

6. The method of claim 1, wherein the length-2 OCC of the second DMRS pattern is repetitive at an interval of twelve REs in frequency domain.

7. The method of claim 6, wherein two REs allocated to the length-2 OCC of the second DMRS pattern are contiguous in frequency domain.

8. The method of claim 6, wherein relative to one of the six CDM groups of the second DMRS pattern, other five CDM groups are shifted in frequency domain by two REs, four REs, six REs, eight REs, and ten REs, respectively.

9. The method of claim 1, wherein the length-4 OCC of the third DMRS pattern is repetitive at an interval of twelve REs in frequency domain.

10. The method of claim 9, wherein four REs allocated to the length-4 OCC of the third DMRS pattern are contiguous in frequency domain.

11. The method of claim 10, wherein relative to one of the three CDM groups of the third DMRS pattern, other two CDM groups are shifted in frequency domain by four REs and eight REs, respectively.

12. The method of claim 9, wherein every two adjacent REs of four REs allocated to the length-4 OCC of the third DMRS pattern are apart from three REs in frequency domain.

13. The method of claim 12, wherein relative to one of the three CDM groups of the third DMRS pattern, other two CDM groups are shifted in frequency domain by one RE and two REs, respectively.

14. The method of claim 9, wherein two first REs that are contiguous in frequency domain and two second REs that are contiguous in frequency domain are allocated to the length-4 OCC of the third DMRS pattern, the two first REs and the two second REs being apart from six REs in frequency domain.

15. The method of claim 14, wherein relative to one of the three CDM groups of the third DMRS pattern, other two CDM groups are shifted in frequency domain by two REs and four RES, respectively.

16. The method of claim 1, wherein the length-6 OCC of the fourth DMRS pattern is repetitive at an interval of twelve REs in frequency domain.

17. The method of claim 16, wherein every two adjacent REs of six REs allocated to the length-6 OCC of the fourth DMRS pattern are apart from two REs in frequency domain.

18. The method of claim 16, wherein relative to one of the two CDM groups of the fourth DMRS pattern, the other CDM group is shifted in frequency domain by one RE.

19. An apparatus, comprising:

processing circuitry configured to determine one or more antenna ports for data transmission, and generate, for each of the one or more antenna ports, a respective demodulation reference signal (DMRS) based on one of a first DMRS pattern, a second DMRS pattern, a third DMRS pattern, and a fourth DMRS pattern; and the one or more antenna ports configured to transmit the one or more DMRSs, wherein the first DMRS pattern includes four code division multiplexing (CDM) groups each comprising a length-2 orthogonal cover code (OCC), the second DMRS pattern includes six CDM groups each comprising a length-2 OCC, the third DMRS pattern includes three CDM groups each comprising a length-4 OCC, and the fourth DMRS pattern includes two CDM groups each comprising a length-6 OCC.

20. A non-transitory computer-readable medium storing instructions which when executed by an apparatus cause the apparatus to perform operations comprising:

determining one or more antenna ports of the apparatus for data transmission;

generating, for each of the one or more antenna ports, a respective demodulation reference signal (DMRS) based on one of a first DMRS pattern, a second DMRS pattern, a third DMRS pattern, and a fourth DMRS pattern; and transmitting the one or more DMRSs, wherein the first DMRS pattern includes four code division multiplexing (CDM) groups each comprising a length-2 orthogonal cover code (OCC), the second DMRS pattern includes six CDM groups each comprising a length-2 OCC, the third DMRS pattern includes three CDM groups each comprising a length-4 OCC, and the fourth DMRS pattern includes two CDM groups each comprising a length-6 OCC.

* * * * *